(12) United States Patent
Szabo

(10) Patent No.: US 7,530,020 B2
(45) Date of Patent: May 5, 2009

(54) COMPUTER GRAPHIC DISPLAY VISUALIZATION SYSTEM AND METHOD

(76) Inventor: Andrew J Szabo, 400 Valley Rd., Cos Cob, CT (US) 06807

( * ) Notice: Subject to any disclaimer, the term of this patent is extended or adjusted under 35 U.S.C. 154(b) by 62 days.

(21) Appl. No.: 11/467,901

(22) Filed: Aug. 28, 2006

(65) Prior Publication Data

US 2006/0288023 A1    Dec. 21, 2006

Related U.S. Application Data

(63) Continuation of application No. 11/073,090, filed on Mar. 4, 2005, which is a continuation of application No. 09/579,217, filed on May 26, 2000, now Pat. No. 6,868,525.

(60) Provisional application No. 60/179,577, filed on Feb. 1, 2000.

(51) Int. Cl.
*G06F 3/00* (2006.01)
*G06F 17/30* (2006.01)

(52) U.S. Cl. .............. 715/738; 715/853; 715/854; 715/962; 707/3

(58) Field of Classification Search .......... 715/700, 715/733, 738, 740, 741, 744, 745, 747, 764, 715/765, 853, 854, 866, 962; 705/14; 707/3, 707/6, 9, 10; 709/203, 217, 219
See application file for complete search history.

(56) References Cited

U.S. PATENT DOCUMENTS

| | | | | |
|---|---|---|---|---|
| 5,974,412 A * | 10/1999 | Hazlehurst et al. | ............. | 707/3 |
| 6,122,634 A * | 9/2000 | Brodsky | ..................... | 707/100 |
| 6,226,648 B1 * | 5/2001 | Appleman et al. | .......... | 707/102 |
| 6,282,538 B1 * | 8/2001 | Woods | .......................... | 707/5 |
| 6,370,537 B1 * | 4/2002 | Gilbert et al. | ............... | 707/101 |
| 6,377,287 B1 * | 4/2002 | Hao et al. | .................... | 715/853 |
| 6,434,556 B1 * | 8/2002 | Levin et al. | .................... | 707/5 |
| 6,460,036 B1 * | 10/2002 | Herz | ........................... | 707/10 |
| 6,470,383 B1 * | 10/2002 | Leshem et al. | .............. | 709/223 |
| 6,763,334 B1 * | 7/2004 | Matsumoto et al. | ........... | 705/14 |
| 6,856,967 B1 * | 2/2005 | Woolston et al. | .............. | 705/26 |
| 7,047,242 B1 * | 5/2006 | Ponte | .......................... | 707/10 |
| 2004/0181554 A1 * | 9/2004 | Heckerman et al. | ...... | 707/104.1 |

\* cited by examiner

*Primary Examiner*—X. L Bautista
(74) *Attorney, Agent, or Firm*—Fitch, Even, Tabin & Flannery

(57) ABSTRACT

An improved human user computer interface system, providing a graphic representation of a hierarchy populated with naturally classified objects, having included therein at least one associated object having a distinct classification. Preferably, a collaborative filter is employed to define the appropriate associated object. The associated object preferably comprises a sponsored object, generating a subsidy or revenue.

43 Claims, 13 Drawing Sheets

COMPUTER GRAPHIC DISPLAY VISUALIZATION SYSTEM AND METHOD

CONTINUITY INFORMATION

The present application is a Continuation of U.S. patent application Ser. No. 11/073,090, filed Mar. 4, 2005, which is a Continuation of U.S. patent application Ser. No. 09/579,217, which claims benefit of priority from U.S. Provisional Patent Application No. 60/179,577, filed Feb. 1, 2000.

FIELD OF THE INVENTION

The present invention relates to the field of human computer interface systems, and more particularly to the field of improved graphic user interfaces for information retrieval systems.

BACKGROUND OF THE INVENTION

For almost as long as computers have existed, their designers and users have sought improvements to the user interface. Especially as computing power has increased, a greater portion of the available processing capacity has been devoted to improved interface design. Recent examples have been Microsoft Windows variants and Internet web browsers. Graphic interfaces provide significant flexibility to present data using various paradigms, and modern examples support use of data objects and applets. Traditional human computer interfaces have emphasized uniformity and consistency; thus, experienced users had a shortened learning curve for use of software and systems, while novice users often required extensive instruction before profitable use of a system. More recently, intuitive, adaptable and adaptive software interfaces have been proposed, which potentially allow faster adoption of the system by new users but which requires continued attention by experienced users due to the possibility of interface transformation.

While many computer applications are used both on personal computers and networked systems, the field of information retrieval and database access for casual users has garnered considerable interest. The Internet presents a vast relatively unstructured repository for information, leading to a need for Internet search engines and access portals based on Internet navigation. At this time, the Internet is gaining popularity because of its "universal" access, low access and information distribution costs, and suitability for conducting commercial transactions. However, this popularity, in conjunction with the non-standardized methods of presenting data and fantastic growth rate, have made locating desired information and navigation through the vast space difficult. Thus, improvements in human consumer interfaces for relatively unstructured data sets are desirable, wherein subjective improvements and wholesale adoption of new paradigms may both be valuable, including improved methods for searching and navigating the Internet.

Generally speaking, search engines for the World Wide Web (WWW, or simply "Web") aid users in locating resources among the estimated present one billion addressable sites on the Web. Search engines for the web generally employ a type of computer software called a "spider" to scan a proprietary database that is a subset of the resources available on the Web. Major known commercial search engines include such names as Yahoo, Excite, and Infoseek. Also known in the field are "metasearch engines," such as Dogpile and Metasearch, which compile and summarize the results of other search engines without generally themselves controlling an underlying database or using their own spider. All the search engines and metasearch engines, which are servers, operate with the aid of a browser, which are clients, and deliver to the client a dynamically generated web page which includes a list of hyperlinked universal resource locators (URLs) for directly accessing the referenced documents themselves by the web browser.

A Uniform Resource Identifier (RFC 1630) is the name for the standard generic object in the World Wide Web. Internet space is inhabited by many points of content. A URI (Uniform Resource Identifier is the way you identify any of those points of content, whether it be a page of text, a video or sound clip, a still or animated image, or a program. The most common form of URI is the Web page address, which is a particular form or subset of URI called a Uniform Resource Locator (URL). A URI typically describes: the mechanism used to access the resource; the specific computer that the resource is housed in; and the specific name of the resource (a file name) on the computer. Another kind of URI is the Uniform Resource Name (URN). A URN is a form of URI that has "institutional persistence," which means that its exact location may change from time to time, but some agency will be able to find it.

The structure of the World Wide Web includes multiple servers at distinct nodes of the Internet, each of which hosts a web server which transmits a web page in hypertext markup language (HTML) or extensible markup language (XML) (or a similar scheme) using the hypertext transport protocol (http). Each web page may include embedded hypertext linkages, which direct the client browser to other web pages, which may be hosted within any server on the network. A domain name server translates a top-level domain (TLD) name into an Internet protocol (IP) address, which identifies the appropriate server. Thus, Internet web resources, which are typically the aforementioned web pages, are thus typically referenced with a URL, which provides the TLD or IP address of the server, as well a hierarchal address for defining a resource of the server, e.g., a directory path on a server system.

A hypermedia collection may be represented by a directed graph having nodes that represent resources and arcs that represent embedded links between resources. Typically, a user interface, such as a browser, is utilized to access hyperlinked information resources. The user interface displays information "pages" or segments and provides a mechanism by which that user may follow the embedded hyperlinks. Many user interfaces allow selection of hyperlinked information via a pointing device, such as a mouse. Once selected, the system retrieves the information resource corresponding to the embedded hyperlink.

One approach to assisting users in locating information of interest within a collection is to add structure to the collection. For example, information is often sorted and classified so that a large portion of the collection need not be searched. However, this type of structure often requires some familiarity with the classification system, to avoid elimination of relevant resources by improperly limiting the search to a particular classification or group of classifications. Another approach used to locate information of interest to a user, is to couple resources through cross-referencing. Conventional cross-referencing of publications using citations provides the user enough information to retrieve a related publication, such as the author, title of publication, date of publication, and the like. However, the retrieval process is often time-consuming and cumbersome. A more convenient, automated method of cross-referencing related documents utilizes hypertext or hyperlinks. Hyperlink systems allow authors or editors to embed links within their resources to other portions of those resources or to related resources in one or more collections that may be locally accessed, or remotely accessed via a network. Users of hypermedia systems can then browse through the resources by following the various links embedded by the authors or editors. These systems greatly simplify the task of locating and retrieving the documents when compared to a traditional citation, since the hyperlink is usually transparent to the user. Once selected, the system utilizes the embedded hyperlink to retrieve the associated resource and present it to the user, typically in a matter of seconds. The retrieved resource may contain additional hyperlinks to other related information that can be retrieved in a similar manner.

A well-recognized problem with existing search engines is the tendency to return hits for a query that are so incredibly numerous, sometimes in the hundreds, thousands, or even millions, that it is impractical for user to wade through them and find relevant results. Many users, probably the majority, would say that the existing technology returns far too much "garbage" in relation to pertinent results. This has lead to the desire among many users for an improved search engine, and in particular an improved Internet search engine.

In response the garbage problem, search engines have sought to develop unique proprietary approaches to gauging the relevance of results in relation to a user's query. Such technologies employ algorithms for either limiting the records returned in the selection process (the search) and/or by sorting selected results from the database according to a rank or weighting, which may be predetermined or computed on the fly. The known techniques include counting the frequency or proximity of keywords, measuring the frequency of user visits to a site or the persistence of users on that site, using human librarians to estimate the value of a site and to quantify or rank it, measuring the extent to which the site is linked to other sites through ties called "hyperlinks" (see, Google.com and Clever.com), measuring how much economic investment is going into a site (Thunderstone.com), taking polls of users, or even ranking relevance in certain cases according to advertiser's willingness to bid the highest price for good position within ranked lists. As a result of relevance testing procedures, many search engines return hits in presumed rank order or relevance, and some place a percentage next to each hit which is said to represent the probability that the hit is relevant to the query, with the hits arranged in descending percentage order.

However, despite the apparent sophistication of many of the relevance testing techniques employed, the results typically fall short of the promise. Thus, there remains a need for a search engine for uncontrolled databases that provides to the user results, which accurately correspond the desired information sought.

Therefore, the art requires improved searching strategies and tools to provide increased efficiency in locating a user's desired content, while preventing dilution of the best records with those that are redundant, off-topic or irrelevant, or directed to a different audience.

Commercial Subsidy (Advertising)

Advertisers are generally willing to pay more to deliver an impression (e.g., a banner ad or other type of advertisement) to users who are especially sensitive to advertisements for their products or are seeking to purchase products corresponding to those sold by the advertisers, and the economic model often provides greater compensation in the event of a "click through", which is a positive action taken by the user to interact with the ad to receive further information.

This principle, of course, actually operates correspondingly in traditional media. For example, a bicycle manufacturer in generally is willing to pay more per subscriber to place advertisements in a magazine having content directed to bicycle buffs than in a general interest publication. However, this principle has not operated very extensively in the search engine marketplace, partly because there is little differentiation among the known characteristics of the users of particular search engines, and because, even after a search inquiry in submitted, there may be little basis on which to judge what user's intention or interest really is, owing to the generality or ambiguity of user's request, so that even after a search request is processed, it may be impossible to estimate the salient economic, demographic, purchasing or interest characteristics of the user in the context of a particular search. In fact, some "cookie" based mechanisms provide long-term persistence of presumed characteristics even when these might be determined to be clearly erroneous. Thus, the existing techniques tend to exaggerate short term, ignorance based or antithetical interests of the user, since these represent the available data set. For example, if a child seeks to research the evils of cigar smoking for a school class project, a search engine might classify the user as a person interested in cigar smoking and cigar paraphernalia, which is clearly not the case. Further, the demographics of a cigar aficionado might tempt an advertiser of distilled liquors to solicit this person as a potential client. The presumed interest in cigars and liquor might then result in adult-oriented materials being presented. Clearly, the simple presumptions that are behind this parade of horribles may often result in erroneous conclusions.

Although a few search engines for the mass market exist that charge a fee for use, this model has not been popular or successful. Instead, most search engines offer free access, subject to user tolerating background advertising or pitches for electronic commerce sales or paid links to sites that offer goods and services, including the aforementioned banner ads. These advertisements are typically paid for by sponsors on a per impression basis (each time a user opens the page on which the banner ad appears) or on a "click-through basis" (normally a higher charge, because user has decided to select the ad and "open it up" by activating an underlying hyperlink). In addition, most search engines seek "partners" with whom they mutually share hyperlinks to each other's sites. Finally, the search engines may seek to offer shopping services or merchandise opportunities, and the engines may offer these either globally to all users, or on a context sensitive basis responsive to a user's particular search.

Targeted Advertising

The current wide-ranging use of computer systems provides a relatively large potential market to providers of electronic content or information. These providers may include, for example, advertisers and other information publishers such as newspaper and magazine publishers. A cost, however, is involved with providing electronic information to individual consumers. For example, hardware and maintenance costs are involved in establishing and maintaining information servers and networks. One source that can be secured to provide the monetary resources necessary to establish and maintain such an electronic information distribution network includes commercial advertisers. These advertisers provide electronic information to end users of the system by way of electronically delivered advertisements, in an attempt to sell products and services to the end users. The value of a group of end users, however, may be different for each of the respective advertisers, based on the product or services each advertiser is trying to sell and the class or classification of the user. Thus, it would be beneficial to provide a system, which allows individual advertisers to pay all, or part of the cost of such a network, based on the value each advertiser places on the end users the advertiser is given access to. In addition, advertisers often desire to target particular audiences for their advertisements. These targeted audiences are the audiences that an advertiser believes is most likely to be influenced by the advertisement or otherwise provide revenues or profits. By selectively targeting particular audiences the advertiser is able to expend his or her advertising resources in an efficient manner. Thus, it would be beneficial to provide a system that allows electronic advertisers to target specific audiences, and thus not require advertisers to provide an single advertisement to the entire population, the majority of which may have no interest whatsoever in the product or service being advertised or susceptibility to the advertisement.

U.S. Pat. No. 5,724,521, expressly incorporated herein by reference, provides a method and apparatus for providing electronic advertisements to end users in a consumer best-fit pricing manner, which includes an index database, a user profile database, and a consumer scale matching process. The index database provides storage space for the titles of electronic advertisements. The user profile database provides storage for a set of characteristics that corresponds to individual end users of the apparatus. The consumer scale matching process is coupled to the content database and the user profile database and compares the characteristics of the individual end users with a consumer scale associated with the electronic advertisement. The apparatus then charges a fee to the advertiser, based on the comparison by the matching process. In one embodiment, a consumer scale is generated for each of multiple electronic advertisements. These advertisements are then transferred to multiple yellow page servers, and the titles associated with the advertisements are subsequently transferred to multiple metering servers. At the metering servers, a determination is made as to where the characteristics of the end users served by each of the metering servers fall on the consumer scale. The higher the characteristics of the end users served by a particular metering server fall, the higher the fee charged to the advertiser.

Each client system is provided with an interface, such as a graphic user interface (GUI), which allows the end user to participate in the system. The GUI contains fields that receive or correspond to inputs entered by the end user. The fields may include the user's name and possibly a password. The GUI may also have hidden fields relating to "consumer variables." Consumer variables refer to demographic, psychographic and other profile information. Demographic information refers to the vital statistics of individuals, such as age, sex, income and marital status. Psychographic information refers to the lifestyle and behavioral characteristics of individuals, such as likes and dislikes, color preferences and personality traits that show consumer behavioral characteristics. Thus, the consumer variables, or user profile data, refer to information such as marital status, color preferences, favorite sizes and shapes, preferred learning modes, employer, job title, mailing address, phone number, personal and business areas of interest, the willingness to participate in a survey, along with various lifestyle information. The end user initially enters the requested data and the non-identifying information is transferred to the metering server. That is, the information associated with the end user is compiled and transferred to the metering server without any indication of the identity of the user (for example, the name and phone number are not included in the computation). The GUI also allows the user to receive inquiries, request information and consume information by viewing, storing, printing, etc. The client system may also be provided with tools to create content, advertisements, etc. in the same manner as a publisher/advertiser.

Use of Transactional Data for Marketing

In recent years, the field of data mining, or extracting useful information from bodies of accumulated raw data, has provided a fertile new frontier for database and software technologies. While numerous types of data may make use of data mining technology, a few particularly illuminating examples have been those of mining information, useful to retail merchants, from databases of customer sales transactions, and mining information from databases of commercial passenger airline travel. Customer purchasing patterns over time can provide invaluable marketing information for a wide variety of applications. For example, retailers can create more effective store displays, and can more effectively control inventory, than otherwise would be possible, if they know that, given a consumer's purchase of a first set of items, the same consumer can be expected, with some degree of probability, to purchase a particular second set of items along with the first set. In other words, it would be helpful from a marketing standpoint to know association rules between item-sets (different products) in a transaction (a customer shopping transaction). To illustrate, it would be helpful for a retailer of automotive parts and supplies to be aware of an association rule expressing the fact that 90% of the consumers who purchase automobile batteries and battery cables also purchase battery post brushes and battery post cleanser. (In the terminology of the data mining field, the latter are referred to as the "consequent.") It will be appreciated that advertisers, too, can benefit from a thorough knowledge of such consumer purchasing tendencies. Still further, catalogue companies can conduct more effective mass mailings if they know the tendencies of consumers to purchase particular sets of items with other sets of items.

It is possible to build large databases of consumer transactions. The ubiquitous bar-code reader can almost instantaneously read so-called basket data, i.e., when a particular item from a particular lot was purchased by a consumer, how many items the consumer purchased, and so on, for automatic electronic storage of the basket data. Further, when the purchase is made with, for example, a credit card, the identity of the purchaser can be almost instantaneously known, recorded, and stored along with the basket data. As alluded to above, however, building a transaction database is only part of the marketing challenge. Another important part is the mining of the database for useful information. Such database mining becomes increasingly problematic as the size of databases expands into the gigabyte, and indeed the terabyte, range. Much work, in the data mining field, has gone to the task of finding patterns of measurable levels of consistency or predictability, in the accumulated data. For instance, where the data documents retail customer purchase transactions, purchasing tendencies, and, hence, particular regimes of data mining can be classified many ways. One type of purchasing tendency has been called an "association rule." In a conventional data mining system, working on a database of supermarket customer purchase records, there might be an association rule that, to a given percent certainty, a customer buying a first product (say, Brie cheese) will also buy a second product (say, Chardonnay wine). It thus may generally be stated that a conventional association rule states a condition precedent (purchase of the first product) and a condition subsequent or "consequent" (purchase of the second product), and declares that, with, say 80% certainty, if the condition precedent is satisfied, the consequent will be satisfied, also. Methods for mining transaction databases to discover association rules have been disclosed in Agrawal et al., "Mining Association Rules Between Sets of Items in Large Databases", Proc. of the ACM SigMod Conf. on Management of Data, May 1993, pp. 207-216, and in Houtsma et al., "Set-Oriented Mining of Association Rules", IBM Research Report RJ 9567, October, 1993. See also, Agrawal et al., U.S. Pat. Nos. 5,615,341, 5,796,209, 5,724,573 and 5,812,997. However, association rules have been limited in scope, in the sense that the conditions precedent and subsequent fall within the same column or field of the database. In the above example, for instance, cheese and wine both fall within the category of supermarket items purchased.

U.S. Pat. No. 5,844,305, expressly incorporated herein by reference, relates to a system and method for extracting highly correlated elements (a "categorical cluster") from a body of data. It is generally understood that the data includes a plurality of records, the records contain elements from among a set of common fields, the elements have respective values, and some of the values are common to different ones of the records. In an initialization step, for each of the elements in the records, an associated value, having an initial value, is assigned. Then, a computation is performed, to update the associated values based on the associated values of other elements. The computation is preferably iteratively to produce the next set of updated values. After the computation is completed, or after all the desired iterations are completed, the final results, i.e., the updated associated values are used to derive a categorical cluster rule. The categorical cluster rule provides the owner of the data with advantageously useful information from the data.

Hierarchal Information Presentation

As the amount of information available to a computer user increases, the problem of coherently presenting the range of available information to the computer user in a manner which allows the user to comprehend the overall scope of the available information becomes more significant. Furthermore, coherent presentation of the relationship between a chosen data unit of the available information to the rest of the available information also becomes more significant with the increase of information available to the user. Most of the existing methods utilize lists (e.g., fundamentally formatted character-based output), not graphic models, to indicate the structure of the available information. The main problem associated with the use of lists is the difficulty of indicating the size and complexity of the database containing the available information. In addition, because the lists are presented in a two-dimensional format, the manner of indicating the relationship between various data units of the available information is restricted to the two-dimensional space. Furthermore, because presentation of the lists normally requires a significant part of the screen, the user is forced to reduce the amount of screen occupied by the list when textual and visual information contained in the database is sought to be viewed. When this occurs, the user's current "position" relative to other data units of the available information is lost. Subsequently, when the user desires to reposition to some other data unit (topic), the screen space occupied by the lists must be enlarged. The repeated sequence of adjusting the screen space occupied by the lists tends to distract the user, thereby reducing productivity.

One attempt to alleviate the above-described problem is illustrated by U.S. Pat. No. 5,021,976, expressly incorporated herein by reference, which discloses a system for enabling a user to interact with visual representations of information structures stored in a computer. In a system of this type, a set of mathematical relationships is provided in the computer to define a plurality of parameters which may be of interest to the user, which mathematical relationships are also capable of indicating a degree of correlation between the defined parameters and segments of information contained in a defined information system. In addition, an "automatic icon" with multiple visual features is provided to enable the user to visualize the degree of correlation between the parameters of interest to the user and the particular data unit stored in the computer that is being examined by computer. As the degree of correlation for a given parameter changes, the visual feature representing that parameter will change its appearance.

Another attempt to coherently present a large body of information to a computer user is illustrated by U.S. Pat. No. 5,297,253, expressly incorporated herein by reference, which discloses a computer-user-interface navigational system for examining data units stored in the memory of a computer system. In this navigational system, the user interface shows a continuous and automatically updated visual representations of the hierarchical structure of the information accessed. By using an input/output device to manipulate icons that appear in a navigational panel, the user can navigate through the information hierarchy. As the user traverses the information hierarchy, a node icon representing each level in the hierarchy accessed by the user is displayed. The user is also able to directly select any level in the information hierarchy between the entry point and the level at which the user is currently located.

Yet another approach to coherently presenting a large body of information to a computer user is "SEMNET," described in: Raymonde Guindon, ed., Cognitive Science and Its Applications for Human-Computer Interaction, (Hillsdale, N.J.: Lawrence Erlbaum Associates, Inc., 1988), 201-232. SEMNET is a three-dimensional graphical interface system that allows the users to examine specific data units of an information base while maintaining the global perspective of the entire information base. The SEMNET developers propose organizing component data units of an information base into various levels of hierarchy. At the lowest level of hierarchy, the most basic data units are organized into various sets, or cluster-objects of related information. At the next level of hierarchy, related cluster-objects from the lower hierarchical level are organized into a higher-level cluster-object. Continuing in this manner, SEMNET achieves a hierarchical organization of the information base. In the graphic display, related data units within a cluster-object are connected by lines, or arcs. In addition, using a "fisheye view" graphic presentation, SEMNET displays the most basic data units near the chosen data unit but only cluster-objects of increasing hierarchy as the distance increases from the chosen data unit. In this manner, the user is able to visualize the organization of the information base relative to the chosen data unit. See, U.S. Pat. No. 5,963,965, expressly incorporated herein by reference.

U.S. Pat. No. 5,812,134, expressly incorporated herein by reference, relates to a system for interactive, dynamic, three-dimensional presentation of a database structure, seeking to allows the user to efficiently navigate through the database to examine the desired information. The system graphically depicts the organization of the information base as "molecules" consisting of structured parallel "threads" of connected nodes, each encompassing a specific aspect of the overall database. Within a given thread, the component nodes, which share a commonality of subject, are arranged in a natural, linear progression that reflects the organizational structure of the information subject represented by the thread, thereby providing the user with a visual guide suggesting the appropriate sequence of nodes to be viewed. By providing a hierarchical representation of the organizational structure of the entire database, the navigational system provides the user with both the "position" of the information unit being currently examined relative to the remainder of the database, as well as the information regarding the overall size and complexity of the database. The system also provides the user with the capability to define one or more "customized" navigation "paths" over the database, as well as copy and modify existing units of information. Thus, a taxonomy is constructed and employed to assist the user.

U.S. Pat. No. 5,774,357, expressly incorporated herein by reference, relates to a system that is adaptive to either or both of a user input and a data environment. Therefore, the user interface itself and/or the data presented through the user interface, such as a web browser, may vary in dependence on a user characteristic and the content of the data.

User Modeling

User modeling means to create a model of the user that contains information about the user that is relevant for a particular system. Thus, the user modeling system seeks to define sufficient characteristics of the user to determine the prospective actions or preferences of the user, and employ these characteristics to make predictions. Often, the user modeling system is used interactively with the user, facilitating the use of the system by intelligently predicting the user's inputs. On the other hand, a sufficiently accurate and constrained user model may also be used as part of an autonomous intelligent agent, i.e. a system that acts on behalf of the user to interact with other systems or persons.

The scope of the user model may include, for example, characteristics of the user which are independent of content, such as language, reading level, fields of expertise, physical impairments, and the like, as well as content specific characteristics, such as the user's taste and interests for motion picture entertainment, for example as part of a film recommending system, or the user's knowledge of a given academic subject, for an educational or testing system.

User preferences may be time dependent, and therefore diurnal or seasonal variations may be important factors in defining an accurate model of the user, i.e., the prediction of the intent and/or desires of the user in a respective context. Linear predictions, based on correlations, may be useful for extracting these patterns from observed sequences. More complex models, such as Markov models, may also be employed as appropriate. Often, the decision space is segmented into multiple operating regions, each defined so that the associated model is linear, e.g., MARS. Alternately, a nonlinear model, such as a neural network, may be implemented. Further, a combination of arbitrary type models and segmented decision space may be employed. A particular advantage of a segmented space is that the model for each respective segment is comparatively simpler, and may often be updated separately from other segments. The segmented architecture is especially advantageous where such models are implemented in applets, wherein the respective applet is simplified, and its execution speeded, by providing a narrower scope. Another advantage of a segmented user model architecture is that, when employed in conjunction with a collaborative filtering scheme, it may facilitate accounting for a greater range of user characteristics, while providing specific preferences.

It is also noted that at a plurality of user models may be employed, for example a content-independent and a content dependent type, with the outputs combined. These models may be segmented along common boundaries, or segmented independently.

Different systems use different techniques for constructing and implementing a user model. The simplest and most straightforward is a technique of a user survey, requiring some dedicated activity of the user toward defining the user model. A second technique monitors the activities of the user to detect patterns and actions indicative of user characteristics.

Intelligent agents can be constructed by monitoring or observing the user's actions with the system, and thereby determining characteristics, habits, tendencies or features of the user. Frequently visited pages, a request for an explanation of a technical term, often or seldom used links and functions are examples of things that can be examined. This is closely associated with machine learning, which means that the system learns the common actions and preferences of the user. Intelligent agents are often used for machine learning and this is a topic of artificial intelligence. This often requires the user to give the system some initial values about his or her knowledge, goals, experience etc. The initial values, or default values if not explicitly given by the user, are used for building a user model that will be altered when the agent discovers new things about the user.

U.S. Pat. No. 5,855,015, expressly incorporated herein by reference, proposes a system for retrieval of hyperlinked information resources which does not require a specific user query to locate information resources of interest, and which actively explores a hyperlinked network to present interesting resources to a user. Heuristics and relevance feedback may be used to refine an exploration technique, or to present resources of interest to a user. The proposed system continually adapts to changing user interests. A system for retrieval of hyperlinked information resources is provided which includes a user interface connected to a programmed microprocessor which is operative to explore the hyperlinked information resources using a first heuristic to select at least one information resource, to present the at least one information resource to the user via the user interface based on a second heuristic, to accept feedback from the user via the user interface, the feedback being indicative of relevance of the at least one information resource, and to modify the first and second heuristics based on the feedback. The patent also proposes a method for retrieval of hyperlinked information resources that includes exploring the hyperlinked information resources using a first heuristic to select at least one information resource, presenting the at least one information resource to the user via a user interface based on a second heuristic, accepting feedback from the user via the user interface indicative of relevance of the at least one information resource, and modifying the first and second heuristics based on the feedback. In one embodiment, the system utilizes a series of training examples, each having an associated ranking, to develop the first and second heuristics that may be the same, similar, or distinct. The heuristics utilize a metric indicative of the relevance of a particular resource to select and present the most relevant information to the user. The user provides feedback, such as a score or rating, for each information resource presented. This feedback is utilized to modify the heuristics so that subsequent exploration will be guided toward more desirable information resources.

The system of U.S. Pat. No. 5,855,015 actively explores a hyperlinked network and presents a manageable amount (controllable by the user) of information to the user without a specific information query. Thus, the method allows selection of information of interest that may have been excluded by a precisely articulated query. Furthermore, rather than inundating the user with information selected from a general, broad query, the amount of information presented to the user is limited so as to minimize the time and effort required to review the information. This system provides ability to automatically learn the interests of the user based on a number of ranked training examples. Once exploration and presentation heuristics are developed, a hyperlinked network may be explored, retrieving and presenting information resources based upon the heuristics established by the training examples. The system is capable of continually adapting the exploration and presentation heuristics so as to accommodate changing user interests in addition to facilitating operation in a dynamic hyperlinked information environment.

U.S. Pat. No. 5,890,152, expressly incorporated herein by reference, relates to a Personal Feedback browser and Personal Profile database for obtaining media files from the Internet. A Personal Feedback browser selects media files based on user-specified information stored in the Personal Profile database. The Personal Profile database includes Profile Objects that represent the interests, attitude/aptitude, reading comprehension and tastes of a user. Profile Objects are bundles of key words/key phrases having assigned weight values. Profile Objects can be positioned a specified distance from a Self Object. The distance from the Profile Object to the Self Object represents the effect the Profile Object has in filtering and/or selecting media files for that user. The Personal Feedback browser includes a media evaluation software program for evaluating media files based on a personal profile database. The Personal Profile database is also adjusted based upon user selection and absorption of media files.

Another way of creating a user model is through the use of collaborative filtering. In this case, the user provides some initial information as well. For a collaborative filter, the user typically identifies himself or herself with a class of users, wither by predefined or adaptive categories. Thus, the emphasis of information gathering is not on the user's own knowledge or goals, but rather personal data such as age, profession or interests. The system then compares this user to other users and looks for users with similar answers to these questions. A user model is then created based on the profiles of similar users. Thus, collaborative filtering techniques typically require that a broad range of user characteristics be acquired and stored without aggregation, for later analysis and correlation to a given pattern.

According to one embodiment, during user interaction with the system, either including an explicit programming step such as a user survey, or through observation of the user, a user's characteristics are determined. Typically, it is too much of a burden on the user to explicitly obtain a complete profile. Therefore, any such profile is acquired in a goal-dependent or context sensitive manner. For example, a set of profiles are related by a decision tree. The user then explicitly or implicitly defines the necessary characteristics to traverse the decision tree to define an unambiguous profile, or to arrive at a set of compromises to define a hybrid profile. Since these profiles are goal-directed, the process of defining the profile is inherent in achieving the goal.

The particular profiles are, for example, defined by a logical analysis of the decision space, or defined by an analysis of a population of users, with each profile representing a cluster within the scope of the decision space. In the former case, it is often difficult to make presumptions about the user outside of the particular decision process; in the later case, by identifying a set of individuals within the population with broadly correlated characteristics with the user, it may be possible to infer user characteristics unrelated to the decision process.

Typically, after an explicit process of defining user characteristics, the system evolves into an adaptive mode of operation wherein the profiles are modified or updated to more accurately correspond to the specific user. Further, as the characteristics of the user become more fully available, collaborative filtering may be employed to make better presumptions regarding unknown characteristics of the user. It is also noted that the system preferably does not presume that the user has a consistent set of characteristics, and thus allows for changes over time and cyclic variations. Preferably, these changes or cyclic variations are analyzed and employed to extrapolate a future state.

A users' knowledge of the subject represented in the hypermedia is a particularly important user feature for adaptive hypermedia systems. Many adaptive presentation techniques rely on a model of the users' knowledge of the subject area as basis for adaptation. This means that an adaptive hypermedia system that relies on an estimate of the users' knowledge should update the user model when the user has presumably learned new things. Further, a preferred user model according to the present invention preferably also models decay of memory.

There are two common ways of representing users' knowledge in an adaptive hypermedia system. The most often used model is the overlay model that divides the hypermedia universe into different subject domains. For each subject domain in the hypermedia universe, the user's knowledge is specified in some way. The user's knowledge of a particular subject domain can be given the value known or unknown, or for instance a fuzzy semantic variable such as good, average or poor. On the other hand, a numeric or continuous metric may be provided. The user's knowledge may also be represented as a value of the probability that the user knows the subject. An overlay model of the user's knowledge can then be represented as a set of concept-value pairs, one pair for each subject. Overlay models were originally developed in the area of intelligent tutoring systems and student modeling, Greer, J. E., & McCalla, G. I. (Eds.): "Student Modeling: The Key to Individualized Knowledge-Based Instruction" NATO ASI Series F Vol. 125 (1993) Berlin: Springer-Verlag, but are also very useful for adaptive hypermedia systems. The main advantage of the overlay model is that users' knowledge on different topics can be measured independently. See, also Gaines, Brian R., and Shaw, Mildred L. G., "Concept Maps as Hypermedia Components", (Internet); Akoulchina, Irina, and Ganascia, Jean-Gabriel, "SATELIT-Agent: An Adaptive Interface Based on Learning Agents Interface Technology", In Anthony Jameson, Cecile Paris and Carlo Tasso (Eds), User Modeling: Proc. Of the Sixth Intl. Conf. UM97, Vienna, N.Y.: Springer Wein, N.Y. (1997); Benaki, Eftihia, Karkaletis, Vangelis A., Spyropoulos, Constantine D, "Integrating User Modeling Into Information Extraction: The UMIE Prototype", In Anthony Jameson, Cecile Paris and Carlo Tasso (Eds), User Modeling: Proc. Of the Sixth Intl. Conf. UM97, Vienna, N.Y.: Springer Wein, N.Y. (1997); Maglio, Paul P., and Barret, Rob, "How To Build Modeling Agents to Support Web Searchers" In Anthony Jameson, Cecile Paris and Carlo Tasso (Eds), User Modeling: Proc. Of the Sixth Intl. Conf. UM97, Vienna, N.Y.: Springer Wein, N.Y. (1997).

The other approach, apart from the overlay model, is the stereotype user model, in which every user is classified as one of a number of stereotypes concerning a particular subject or area. There can be several subareas or subjects, so one user can be classified as a different stereotype for different subjects. For instance, a novice stereotype, an intermediate stereotype and an expert stereotype can be defined for one subject in a system, and every user is therefore classified as one of an expert, novice or intermediate on that particular subject. This scheme is much simpler to implement, but caries the disadvantage of not being able to tailor the appearance of the system to every individual user. Hohl, H., Böcker, H., Gunzenhäuser R.: "Hypadapter: An adaptive hypertext system for exploratory learning and programming", User Modeling and user adapted Interaction 6, 2-3, (1996) 131-156, have shown that overlay modeling and stereotype modeling can be combined in a successful way. The stereotype model is used for new users to quickly create a reasonably good user model. Then the overlay model is used with initial values set by the stereotype model.

Users' goals often change from system usage session to session or even within a single session. The user's goal is often highly dependent on the kind of system employed. In educational hypermedia systems, the goal is often to learn a particular subject, or to solve a problem. In information retrieval systems, the goal can be to find a particular piece of information. In an institutional hypermedia system, the goal can be simply to do everyday work, which may be less easily described in generic terms. In systems where the set of goals is relatively small are unrelated to each other, Höök, K., Karlgren, J., Waern, A., Dahlbäck, N., Jansson, C. G., Karlgren, K. and Lemaire, B.: "A glassbox approach to adaptive hypermedia"; User Modeling and User-Adapted Interaction, 6, 2-3, (1996) 157-184, the system simply includes this goal in the user model. More complex and advanced systems, where goals cannot be separated distinctly, require more advanced inclusion and distinction of goals in the user model. One way of dealing with this is to create goal-value pairs for every possible goal in the user model, where the value is the probability that the user has this particular goal.

In some adaptive hypermedia systems, the user's background is considered relevant. The user's background means all information related to the user's previous experience, generally excluding the subject of the hypermedia system, although this exclusion is not necessary in all cases. This background includes the user's profession, experience of work in related areas and also the user's point of view and perspective.

The user's experience in the given hypermedia system means how familiar the user is with the appearance and structure of the hyperspace, and how easy the user can navigate in it. The user may have used the system before, but does not have deep knowledge of the subject. On the other hand, the user can know a lot about the subject, but have little experience of the hypermedia system. Therefore it is wise to distinguish between the user's knowledge and the user's experience, since optimal adaptations for each factor may differ.

The user's preferences are used in adaptive information retrieval systems mostly where they are the only stored data in the user model. Users' preferences are considered special among user modeling components, since they cannot be deducted by the system itself. The user has to inform the system directly, or by giving simple feedback to the system's actions. This suggests that users' preferences are more useful in adaptable systems than in adaptive systems. However, users' preferences can be used by adaptive hypermedia systems as well, as shown by Höök, K., Karlgren, J., Waern, A., Dahlbäck, N., Jansson, C. G., Karlgren, K. and Lemaire, B.: "A glassbox approach to adaptive hypermedia"; User Modeling and User-Adapted Interaction, 6, 2-3, (1996) 157-184. Höök et al. have found that adaptive hypermedia systems can generalize the user's preferences and apply them on new contexts. Preferences are often stored as numeric values in the user profile, contrary to the case for other data, which is often represented symbolically. This makes it possible to combine several users' preferences, in order to formulate group user models. Group models are useful when creating a starting model for a new user, where this user can define his or her preferences, and then a user model is created based on the user models of other users who are in the same "preference group".

Adaptive navigation support is used for helping the user to find the right paths through the hyperspace, by adapting the link presentation to the user's goals, knowledge, etc. Brusilovsky, P.: "Methods and techniques of adaptive hypermedia"; User Modeling and User-Adapted Interaction, 6, 2-3 (1996) 87-129, has found five different ways of adapting links to a user: direct guidance, sorting, hiding, annotation and map adaptation. Direct guidance means that the system suggests which links are best for the user to follow according to the user's goal, etc., in the user model. Sorting is an extension of direct guidance; all links are given a value according to how relevant they are for the user's goals etc. Hiding simply means that links that are considered not interesting for the user at the moment are hidden. In adaptive annotation systems, links are given a sort of comment about the current state of the node behind the link, for instance "not ready to be read yet". Map adaptation takes into account the human-computer interaction part. This is the only technique capable of fully adapting the layout of a page.

Machine learning and use of intelligent agents is a more useful technique than collaborative filtering, with respect to adapting the user interface to different users' needs. The reason for this is that the same user can have different needs at different times and therefore the system must respond to the user, and examine the user's actions, in order to understand what the user needs. In other systems that use user modeling, for instance in film recommending systems, the system already knows what the user wants and the interaction with the user is not as important.

U.S. Pat. No. 6,012,051 (Sammon, et al.), expressly incorporated herein by reference, relates to a system for processing user profiles to determine product choices likely to be of interest.

U.S. Pat. No. 6,006,218 (Breese, et al.), expressly incorporated herein by reference, relates to a method and apparatus for retrieving, sorting and/or processing information based on an estimate of the user's knowledge or familiarity with an object.

U.S. Pat. No. 6,012,052 (Altschuler, et al.), expressly incorporated herein by reference, relates to a method and apparatus for building resource transition probability models for use in various manners.

U.S. Pat. No. 6,014,638 (Burge, et al.), expressly incorporated herein by reference, relates to a system for customizing computer displays in accordance with user preferences. In accordance with the present invention, the user displays may thus be customized in accordance with a past history of use, including navigational choices, and personal characteristics and preferences.

U.S. Pat. No. 5,978,766 (Luciw), expressly incorporated herein by reference, relates to a system and method for suggesting nodes within a choice space to a user based on explicitly defined and/or observed preferences of the user.

U.S. Pat. No. 5,977,964 (Williams, et al.), expressly incorporated herein by reference, relates to a method and apparatus for automatically configuring a system based on a user's monitored system interaction.

U.S. Pat. No. 5,974,412 (Hazelhurst, et al.), expressly incorporated herein by reference, relates to an intelligent query system for automatically indexing information in a database and automatically categorizing users.

U.S. Pat. No. 5,970,486, (Yoshida, et al.), expressly incorporated herein by reference, relates to a method and apparatus for creating situation-dependent keywords, based on user characteristics and preferences, which are then used to define a query.

U.S. Pat. No. 5,963,645 (Kigawa, et al.), expressly incorporated herein by reference, relates to a system for receiving and employing personalized broadcast program metadata.

U.S. Pat. No. 5,801,747 (Bedard), expressly incorporated herein by reference, relates to a method and apparatus for monitoring a user's content consumption, to infer user preferences therefrom.

U.S. Pat. No. 5,758,259 (Lawler), expressly incorporated herein by reference, also relates to a user preference profile determination system which monitors user activity.

U.S. Pat. No. 5,945,988 (Williams, et al.), expressly incorporated herein by reference, further relates to a similar system for dynamically updating inferred user preferences based on user activity.

U.S. Pat. No. 6,005,597 (Barrett, et al.), expressly incorporated herein by reference, relates to a system and method for monitoring user content consumption and creating a dynamic profile based thereon, which is then used to sort future available content.

U.S. Pat. No. 5,973,683 (Cragun, et al.), expressly incorporated herein by reference, relates to a system for the dynamic regulation of television viewing content based on viewer profile and viewer history.

U.S. Pat. No. 5,946,490 (Lieberherr, et al.), expressly incorporated herein by reference, relates to an automata-theoretic approach compiler for adaptive software. Such a compiler could be used, for example, to produce customized applets for users representing a set of search results, or incorporating user profile data. See, also:

Boyle C. and Encarnacion A. O.: "MetaDoc: an adaptive hypertext reading system"; User modeling and User-Adapted Interaction, 4 (1994) 1-21.

Brusilovsky, P., Eklund, J.: "A study of user model based link annotation in educational hypermedia"; Journal of Universal Computer Science, Vol. 4 No 4 (1998) 429-448.

Chin, D.: "User Modeling in UC: the Unix Consultant"; Proceedings of the CHI-86 Conference, Boston (1986)

Moore, J. D. & Swartout, W. R.: "Pointing: A way toward explanation dialogue"; Eight National Conference on Artificial Intelligence, (1989) 457-464.

[AVANTI homepage] http://zeus.gmd.de/projects/avanti.html

Fink, J., Kobsa, A., Schreck, J.: "Personalized hypermedia information provision through adaptive and adaptable system features: User modeling, privacy and security issues" http://zeus.gmd.de/UM97/Fink/Fink.html Eftihia Benaki, Vangelis A. Karkaletsis, Constantine D. Spyropoulos, "Adaptive Systems and User Modeling on the World Wide Web", Proceedings of the workshop, Sixth International Conference on User Modeling, Chia Laguna, Sardinia, 2-5 June 1997

Brajnik, G., Guida, G., Tasso, C., (1990): User modeling in Expert Man-Machine Interfaces: A case study in Intelligent Information Retrieval, in IEEE Transactions on systems, man, and cybernetics, 20:166-185.

Brajnik Giorgio and Carlo Tasso, (1994): A shell for developing non-monotonic user modeling systems in International Journal of Human Computer Studies, 40:31-62.

Croft, B. and Thompson, R., (1986): An overview of the IR Document Retrieval System, in Proceedings of the 2nd Conference on Computer Interfaces and Interaction for Information Retrieval.

Karkaletsis, E., Benaki, E., Spyropoulos, C., Collier, R., (1996): D-1.3.1: Defining User Profiles and Domain Knowledge Format, ECRAN.

Kay, J., (1995): The um toolkit for Cooperative User Modeling, in User Modeling and User-Adapted Interaction, 4:146-196.

Jon Orwant, (1993): Doppelganger Goes to School: Machine Learning for User Modeling, M.Sc. thesis at MIT.

J. Orwant, "For want of a bit the user was lost: Cheap user modeling", MIT Media Lab, Vol. 35, No. 3&4 (1996).

Rich, E., (1983): Users are individuals: individualising user models in International Journal of Man-Machine Studies, 18:199-214

Collaborative Filters

Collaborative filtering is a process that seeks to determine common habits for a group of individuals having a common characteristic. The information is commercially valuable, for example, because knowing what a consumer has purchased, it is possible to statistically predict what else he or she might buy, and to suggest such a purchase to the consumer. This collaborative filtering is preferably used in conjunction with a past history of the user himself, providing a powerful tool for predicting consumer behavior and preferences.

Collaborative filters presume characteristics of the user based on a class identification of the user. A collaborative filter may be adaptive, meaning that it is updated based on actions subsequent to the classification of the user relating to the success or quality of the classification. According to an adaptive embodiment of a collaborative filter of the present invention, therefore, it is preferred that the client system, either concurrently with use of the system by the user, or subsequently, transmit to the server sufficient information to update the collaborative filter for more accurately classifying the user and/or for more accurately defining the characteristics of a respective classification.

Collaborative filtering is often used in systems that continuously present new things to their users such as film recommending systems and personally adapted news. If the user does not like one suggestion from the system, he or she tells the system that this material is not interesting and the user profile is updated. Typically, the weight afforded to adaptive features is low, and indeed the feedback from one user is just one input to the system, and thus will typically not cause a major change in the user profile, since most of it still is valid. Systems that adapt the user interface to different users' needs often need to give the user more control over the adaptation process. It is much more difficult to predict the user's preferences correctly in these systems since they may vary with time. For instance, the user's knowledge of a subject can be a component in the user model, and it is hard for the system to predict exactly when a user has learned something new. The system needs some help from the user, and what the user says is more important than the current user model. The user model has to be modified completely to what the user has said. Therefore, intelligent agents and machine learning are preferred in these systems.

Collaborative filters and user profiles necessarily require that personal user information be employed. This personal information may include private user information, such as demographics, preferences, past purchase history, media consumption habits, and the like, or confidential information including trade secrets, or information otherwise not intended for publication. The unrestricted release and distribution of this private user information, or the risk of dissemination, is typically undesirable, from the user's viewpoint. In the case of collaborative filtering systems, this information must be stored centrally, thereby creating a risk of breach. In the case of adaptive personal profile systems, client-side filtering may be employed; however, this necessarily entails transmission of a greater amount of information to the user than is presented to the user. Client-side filtering requires that all information be transferred to the client system, which is often expensive or untenable. In general, any time valuable personal profile information exists, even in when physically in a client system, a risk of misuse or misappropriation exists.

The release and distribution of private user information, such as demographics, preferences, past purchase history, media consumption habits, and the like, typically is avoided, and may be limited by law or agreement. Therefore, one option available for filtering or processing information based on this information is at the client system, where the private information need not be released or distributed. For example, see U.S. Pat. No. 5,920,477, expressly incorporated herein by reference, and Metabyte Inc., www.mbtv.com, which disclose systems for determining user preference profiles for television programs, implementing a client-side filter. However, this requires that all (unfiltered) information be transferred to the client system, for subsequent filtering, which is often expensive or untenable. Further, this requires computational resources at the client for filtering the content. However, in various circumstances, such techniques may be employed.

SUMMARY AND OBJECTS OF THE INVENTION

The present invention provides a personal services infrastructure™, which unifies the visual environment through the use of stylized taxonomic trees and timelines ("maps"). The mapping process transcends the cumbersome "file folder" technology offered for many years by the leading operating systems and browsers, with gains in understanding, flexibility and compactness. A particular aspect of the present invention is that with an intelligent organization of information, supplemental information, i.e., information not originally part of the data being organized or displaced from its proper location within a classification system, may be presented with properly organized information.

The present invention provides, according to a preferred embodiment, a method of visualization of a set of elements in a computer graphic interface, comprising defining a hierarchy of objects, each hierarchal level within the hierarchy having at least one object, the at least one element having one parent hierarchal object and optionally a set of child objects, with a set of content objects populating the hierarchy; defining, based on a user input, a selected object within the hierarchy for examination; and generating a display on the graphic user interface, presenting the selected object element and any child objects thereof; a representation of parental objects within the hierarchy, with a representation of a hierarchal representation thereof; wherein each of the parent and child objects is associated with a hyperlink, a selection of a respective hyperlink serving to transform that element into the selected element, wherein when a content object is selected, an associated set of related objects is displayed. Therefore, the present invention provides a graphic hyperlink hierarchy providing, with a display of a content object, a display of an associated object.

Preferably, the associated object is defined by a process of collaborative filtering. For example, the associated object may be an advertisement, offer of a product or service for sale, or a set of information. Preferably, an economic motivation is present for defining the associated object, for example, a sponsor or other party might seek, based on an identification or special characteristics of the user or the class of content, to communicate with the user.

The associated object is preferably contextually appropriate, although in some instances, the associated object will have no apparent relation. Thus, for example, political ads may appear in blanket campaigns, regardless of the context, except that such ads may be directed more toward adults than children.

The present invention also provides a method for a user, having found a Web or non-Web resource of interest and relevance, to find similar resources. According to this method, the user selects the preferred resource. That resource is then mined for concepts and phrases, of which the most prominent are presented to user as a second step. User selects which concepts are relevant to finding similar resources. A search or metasearch is then carried out, in which these particular concepts are searched for.

A parallel process is provided for the user to find a similar product to a preferred product. A special feature of this process is that characteristics of the product or service are mined for, including for example nature of product, price, quality, warranty features, and service. The user is then asked to rank or rate the importance of those features that are important to user. A search of metasearch is then carried out. The user is presented with a selection of similar products or services. Alternatively, or in combination with the above method, user's query may be "broadcast" over a computer network or otherwise and invitations made to potential sellers to make an offer of the same or similar product or service, with each seller competing to make the best offer. User would then be offered a selection from these competing offers. As a special feature of this competition, offers could be displayed as made, with the possibility of a fixed offering period or an open offering period. Generally speaking, a user having focused on a particular item that user is considering for purchase, the broadcast of this information may lead to a user receiving a better offer, in terms of user's preferred ensemble of product characteristics, or elicit product alternatives that user may not have known of or could not have accessed. The items offered may be displayed in the portion of the visualization where collaborative filtering content of commercial suggestions are usually displayed.

The object is preferably defined by a query, for example a Boolean search of the content represented in hierarchy of objects.

This supplemental information is provided either to enhance the user's experience or results, or to provide revenues. Exemplary revenue producing transactions include advertising and electronic commerce opportunities.

The present invention is preferably implemented using a web browser, such as Netscape Navigator or Microsoft Internet Explorer, using hypertext markup language (HTML) and/or extensible markup language (XML), and optionally helper applications, JAVA applets, Visual Basic applets or programs (e.g., OCX), or other known program constructs. The browser typically resides on a client system, having a user interface, processor, storage, and a connection to a communications network. The database server is typically remote from the user, and services a large number of users. See, "The Java™ Language Environment: A White Paper", James Gosling & Henry McGilton, www.quant.ecoli.klte.hu/java/java$_{13}$ whitepaper$_{13}$ 1.html (et seq.). The client system is typically capable of storing and processing information locally, while the communications network connection may prove rate limiting. Therefore, it is preferred to employ the storage and processing capacity of the client system to reduce the information that must be transmitted. Further, the browser typically provides a document page model for information display, which may be quite limiting. The present invention therefore preferably provides an application or applet for providing advanced display and interaction facilities for interfacing the user with the information from the server.

An applet is a program designed to be executed from within another application, for example a JAVA applet executing within the JAVA Virtual Machine (JVM). Unlike an application, applets typically cannot be executed directly from the operating system; in other words, the applet typically relies on resources that are not native to the operating system, but rather are supplied by the host application. When OLE (object linking and embedding) techniques are employed, an appropriately designed applet can be invoked from many different applications. According to a preferred embodiment of the invention, enhanced functionality is provided by a downloadable applet that does not require a user-install process or lengthy download times.

Zoomable Nested Nodal Hierarchies

The system according to the present invention preferably provides an improved user interface which may include the visual presentation of information in a form that is (a) hierarchal, that is, organized in levels of generality according to a scheme, (b) nested, that is set together in groups depending upon associated characteristics, (c) zoomable, in the sense that a user, in varying by at least one degree the level of generality, also varies the view (not necessarily continuously zoomable, like a lens, but sometimes stepwise zoomable), and/or (d) nodal, in the sense that points are presented to user as hyperlinks to a particular level of generality. Such representations including all these characteristics are called zoomable nested "nodal networks". A nodal network consists of a set of "nodes", or discrete and defined objects, connected by links, each link typically having two ends and defining relationship between the linked objects. The term zoomable infers that the nodal network may be examined and convey useful information on a plurality of different scales, and thus may be represented to the user at such different scales. These elements define a hyperlink tree, i.e., a nodal network wherein each node represents and identifies an object, the object being generally accessible by selecting a respective node, and wherein the zoom provides a selective disclosure of underlying nodes based on a degree of scrutiny or "zoom". Such zoomable nested nodal networks resemble a traditional botanical taxonomic tree, and thus these networks may be called "trees". According to the present invention, however, the rules and tenets of taxonomy are not absolute, allowing a greater degree of flexibility for display, representation and manipulation of the objects and information represented. Of course, a formal taxonomy may be adopted.

One hyperlink tree, a Hyperbolic Tree™ (Inxight Software Inc., Palo Alto Calif.), developed at Xerox PARC, is disclosed in John Lamping, Ramana Rao, and Peter Pirolli, "A Focus+ Context Technique Based on Hyperbolic Geometry for Visualizing Large Hierarchies", CHI 95, http://www.acm.org/sigchi/chi95/proceedings/papers/jl$_{13}$ bdy.htm. See also, www.inxight.com, http://www.inxight.com/News/Research_ Papers_Files/Z-GUI Article.pdf?.

An alternate hierarchal representation of information is provided by TheBrain.com, Santa Monica, Calif. 90404, www.thebrain.com, which has developed a dynamic information presentation applet showing hierarchal links between data elements, which may include hyperlinks to associated resources. More recently, TheBrain.com has developed an Open Directory Project search service for presenting search results within their applet framework. This is not believed to be prior art to the present invention.

In additional to multiresolution representation and analysis (e.g., zoomable viewing), there are other options that may be predefined or defined by the user with respect to information or organizational display. For example, the tree structures may be represented as horizontally or vertically oriented taxonomic trees, a radially oriented tree, an outline with indentations, a conceptual map, a 3D conceptual map, with a virtual third dimension, such as "height", added to the image, an n-space map, with multiple degrees of freedom represented in various visual or other sensory means, or the like.

According to the present invention, a set of information may be transmitted from the server to the client, for presentation to the user. The information may be classified according to the ultimate taxonomy, regardless of the level of analysis employed by the user, or may be classified only to a lesser level of granularity, for example a level specified by the user or adaptively determined based on the user query, user profile, and the information content retrieved.

U.S. Pat. No. 6,014,671 (Castelli, et al.), expressly incorporated herein by reference, relates to an interactive retrieval and caching of multi-dimensional data using view elements. According to this patent, view elements include node elements and transition elements between nodes.

Protection of Personal Profile Information

The present invention proposes a number of means for minimizing the risk of release of personal information. For example, the present invention provides a set of Intelligent Agents, wherein the private information forming the basis for agent action is encrypted using a secure encryption method, either embedded or associated with the Intelligent Agent, or securely transmitted to it. The encryption technique may be of any suitable known type, for example public key/private key techniques, RSA algorithms, elliptic key techniques, etc. The Intelligent Agent preferably is provided as an applet, either integral with the user interface applet or associated with it. On the other hand, an Intelligent Agent applet may also physically reside at a server location, being shielded from interrogation or analysis by a combination of so-called firewall protection, encryption, and logical restrictions on the quantity and nature of information released. The Intelligent Agent further is preferably protected from being probed to methodically determine the included private information, such as by generating spurious responses or "pseudorandom noise" (an apparently random yet predictable pattern based on a complex algorithm), which may be filtered at the client system, and by storing and analyzing a history of usage to detect and thwart hacking. While there may be cryptographic methods for breaching these types of security measures, such methods are computationally intensive and therefore may be more difficult than other surreptitious methods of obtaining the private information.

The present invention thus provides an intelligent agent system, wherein the user private information is encrypted using a secure encryption method, either embedded in a custom intelligent agent for each user, interactively and securely transmitted to it. The encryption scheme may be of any suitable known type. In this case, the server stores a set of user-specific intelligent agent applets or data files, which are called upon as required to provide or supplement information about the user. These intelligent agents or data files may be adaptively updated, based on recent feedback from the user or respective use, with the updated agent or data file encrypted and the raw data purged. Therefore, the intelligent agent applet may physically reside at a server location, while being shielded from interrogation or analysis by either a secure firewall, encryption, or both. The intelligent agent further is preferably protected from being probed to determine the private information, such as by generating spurious responses (or being formulated with a portion of spurious data) or producing "pseudorandom noise" (an apparently random yet predictable pattern based on a complex algorithm), which may be filtered at the client system based on a knowledge of the complex algorithm, and by storing and transmitting a history of usage to detect tampering. While there may be cryptographic methods for breaching this security, such methods are computationally intensive and therefore may be more difficult than other surreptitious methods of obtaining the private information.

Hierarchal/Taxonomic Organizational Schema

According to the present invention, an information retrieval hypermedia system is provided which includes an adaptive user interface, in which presented search results contain hierarchal associations of sets of documents, wherein respective hierarchal associations are based on user-specific data distinct from the formal query itself. Thus, for example, according to a user hierarchal schema, documents providing similar or related information are classified together, wherein this similarity or relatedness is not defined intrinsically in the query. Further, the hierarchal schemas may be persistent, and applied to results of multiple distinct queries. Alternately, a user hierarchal schema may be specifically defined for a particular query or topic of inquiry. By providing an organization of query responses, users may define a broad query scope that encompasses a desired topic, but may also encompass other topics, either intentionally or because the user is unable to a priori precisely define the query scope. Often, a query produces a large number of hits, and the user has difficulties finding relevant information in an unorganized set of query results. By presenting a linkage between similar documents, the user may not have to go through all responses to the query (search hits), but can skip many documents after having characterized the group or the contents of the group, e.g., read one of the documents.

An aspect of the invention therefore provides means for the user to refine the search criteria in order to improve the precision of search results returned. Preferably, this is an interactive process in which packets of information are communicated between the client and server, although it is possible to conduct this process solely on the client system. Where an interactive scheme is employed, it is possible to transmit, for example, marketing information to the user (e.g., banner ads) with each downloaded packet, or otherwise communicate information in spare or otherwise available bandwidth during this process. These added opportunities may be used, for example, to subsidize the use of the system that allows the user to define or refine the query.

This intelligent assistance preferably involves an interactive communication between the user and search engine, wherein a context, e.g., semantic taxonomic placement, of the search query is successively defined and refined. Preferably, after the context of the query is defined, the user is presented with a hierarchal tree of contents, i.e., a branched hierarchical graphic representation of the information and linkages, for confirmation. In the event that the relayed context is accurate, a simple confirmation is accepted. On the other hand, where the context is not accurate or of inappropriate scope, the user may change or refine the context. In this way, the number of complete database searches is reduced, and the results tailored to the user's expressed requirements.

By providing a hierarchical tree of contexts, the user is prompted to select or accept the narrowest definition scope of the query. In most instances, this will result in a narrower search than a simple one or two word query, but it may also provide an intelligent means for broadening the scope while avoiding an undue number of returned irrelevant hits.

The hierarchical tree of contexts may be presented to the user in a bounded rectangular box, for example showing three levels of hierarchy, with a single node at the highest level, a set of intermediate level nodes defining a range within the generic (highest level) taxonomy, but not necessarily being exhaustive for that level. A selected set of lower level nodes are also presented, which also need not be exhaustive, and in fact, it is preferred that this level be truncated if necessary in order to reduce visual clutter. The nodes are preferably connected with line segments. In the event that an ambiguity is presented, or otherwise the user is to be presented with multiple discontinuous representations of the taxonomy, each may be presented in a separate bounded rectangle. It is understood, of course, that the tree structure need not be presented in a rectangle, and indeed alternatives to a visual tree are also possible.

Preferably, each node within the structure is active, so that a graphic manipulation of the node in a web browser may be detected. This node need not represent a hyperlinked URI, however, and means are preferably provided for selection of one or more nodes by the user without intermediate screen information refresh. In fact, in some embodiments, only terminal child nodes of a hierarchal object are hyperlinked, for example to URIs or a search results page object, with all higher order nodes being locally interpreted at the client system.

In one embodiment, the nodal representation is presented as a graphic map, wherein a Cartesian coordinate of a pointing device is transmitted to the server to indicate a manipulation thereof. The server correlates the coordinates of manipulation with the graphic element at that point. Alternately, an applet may be provided to generate the nodal graphic. In this case, the helper application may intercept and process manipulation of the graphic, without requiring intervention of the server. Further, the applet may locally store a larger portion of the taxonomic structure than is displayed, which will allow faster refresh and improved real time interactivity, at the potential expense of a longer initial activation latency. Preferably, an applet locally stores a set of higher levels of the taxonomic hierarchy, as well as a cache of recently used lower levels. As the taxonomy requires updating, the applet may communicate with the server. In addition, the applet may provide further graphic information to the user, for example relevant ads or navigational hints, without interrupting the user's interaction with the nodal representation.

Typically, the taxonomic contexts will be semantic, e.g., a verbal expression of an idea. The hierarchical taxonomy will therefore represent, at least in part, a linguistic analysis of the proposed query. Typically, the taxonomy will include a single linguistic concept, which will be distinguished from other concepts, even those with an identical literal expression. In some cases, a multi-term query will represent an attempt to define a single linguistic concept. In that case, a single taxonomic classification will be defined, and the search formulated to retrieve records corresponding to that concept. Often, it is not or will not be possible to determine a context of a record a priori, i.e., during the indexing process. In that case, the record may be analyzed as a part of the search process to determine if it meets the search criteria or otherwise the ranking it should receive for relevance. On the other hand, it may be impossible to determine automatically (or manually) the context of a record. In that case, a set of rules may be applied to deal with this case. For example, the user may determine that these records should be retrieved, should be ignored, should be given a high or low ranking, or otherwise. The rules may also take into consideration the quantity and nature of other records retrieved (or excluded). Typically, it is desired to maintain a stateless condition, therefore, once the search query is executed, the results should be downloaded to the client, or explicitly defined in a URI. The database server, therefore, typically does not retain the query response for an extended period. See, e.g., U.S. Pat. No. 6,012,053 (Pant, et al.), expressly incorporated herein by reference. However, the server may retain search results for a period of time, for example 5 days, to allow the user access to prior search results from the server (e.g., allowing the user to employ multiple client computers or diskless computers), and to provide data for the server to establish user profiles.

In another aspect of the invention, the search query need not be limited to linguistic concepts. Therefore, the search may involve images, video, audio, or other types of data. In this case, the taxonomy may be based, for example, on characteristic patterns or attributes of the data sought. It is noted that there are a number of systems available that support non-verbal data access and retrieval. These include the QBIC system from IBM, products from Virage, Informix, Excalibur, Magnifi, Muscle Fish LLC, and a number of other entities. In fact, the interactive search definition according to the present invention is advantageous where a simple verbal search query is untenable, such as in searching non-linguistic data.

In some instances, the context of the query will not be fully or appropriately defined by a predetermined linguistic taxonomy. Therefore, the system may define a temporary or artificial taxonomy. This taxonomy may be based, for example, on an analysis of the records (or a select subset) themselves, or by the user during the interactive process. It is also possible for a user to store a preference profile, which may include, for example, taxonomic or heuristic concepts. The database server, therefore, may reference this profile in responding to the query. In known manner, this profile may be stored locally on a client system, e.g., as a cookie, or remotely, in a server in a file referenced to the user. For example, U.S. Pat. No. 5,895,471, expressly incorporated herein by reference, relates to a system for use with mobile, storage constrained clients, which stores hypermedia links such as Uniform Resource Locators (URL), used to identify and control access to resources on the network, on a server remote from the client device. Another system provides a globally unique identifier (GUI) to track users across secure and insecure networks. See, U.S. Pat. No. 5,966,705, expressly incorporated herein by reference.

A user may, for example, be provided with a personal web page, including a variety of information. In some instances, this information will be personal, and will therefore be maintained in secrecy, for example requiring passwords and/or support for encryption (e.g., secure socket layer [SSL] communications). Advantageously, the information associated with this web page may be updated and enhanced automatically, to represent a history of use by the user. Because this web page is maintained separately from the database server, it is accessible to a variety of servers, and further may be referenced by URL. Therefore, this scheme allows an on-line "memory" and persistence of complex parameters even where the system is otherwise stateless. This scheme differs from the simple use of Internet cookies, in that the file may be stored remotely, and is therefore not encumbered by the communication link between the user and server. Further, it is possible to perform analysis, e.g., stochastic analysis, of the profiles of a number of users, in order to improve the performance of the system. These files are "personal", which mean they are linked to the identity of the particular user, rather than the particular machine from which he communicates.

In the taxonomic representation, which, as discussed above, is preferably a tree structure, each node may be a hyperlink, meaning that a selection of that node indicates a reference to another data object or URI. See, e.g., U.S. Pat. No. 6,018,748 (Smith), expressly incorporated herein by reference. In some instances, the selection of a node will be employed to define a refinement of the taxonomic definition. In other instances, the selection of a node may point directly to a data element. Thus, for example, where the taxonomic definition is sufficiently specific, the selection of a node automatically calls a URI, which may initiate a search in a search engine or call a specific web page. On the other hand, the user may select a group of nodes to define a concept cluster. Graphically, the user may circumscribe a set of nodes, potentially across multiple taxonomic levels or even discontinuous through the taxonomy, to define the context. Where a node or group of nodes represent a search definition, the definition may be directly derived from the taxonomy, or it may represent the labors of human experts who translate the context of a node into an optimized query. Likewise, the query string itself may vary depending on the search engine referenced. Further, the search string may also vary in dependence on a "sophistication" or "role" of the user.

The user may create de novo, modify or extend a predefined taxonomy based on use or particular requirements. Therefore, the present invention provides a generic taxonomic structure for the organization of knowledge, and in particular computer and Internet platformed information, and to which a set of new, predefined or extensible definitions may be associated. From a commercial point of view, each person's activities and interests could be seen as hot spots on a predefined taxonomic map. To use a visual metaphor, a set of transparencies, each representing a taxonomic map of a person's interests and activities overlaid upon one another, would show darkened areas similar to population clusters in a population map. This metaphor could also be translated into a statistical model of groups of people sharing common interests for the purpose of sales and e-commerce. The present invention therefore encompasses the collation and use of such taxonomic maps of the activities and interests of specific populations. These may be used, for example, to generate custom sales catalogs, either printed or on-line.

The present invention also encompasses selections of information, e.g., customized catalogs, generated for individuals or population groups, based on the structure or statistical density of populated nodes on a taxonomic classification of interests and activities.

The present invention also encompasses the idea that there are certain domains of knowledge where a user may never have an interest. Thus, a child may have little interest in real estate listings. It provides the opportunity for user to exclude certain categories of information on a durable basis. This may be accomplished through a keyword methodology—certain keywords are related to real estate listings and suggest nonrelevance, or by taxonomic exclusion, so that certain branches of a taxonomic tree are durably or semi-durably excluded. This approach to date has been limited to exclusion of "adult" material, but it has a much broader utility. In distinction to "smut filters", the system according to the present invention is therefore adaptive, providing individualized filters and inclusion/exclusion (or ranking) criteria. In fact, these criteria may be context sensitive, such that application of a criterion is dependent on the history of use (recent and/or long term), data environment of the system, e.g., explicitly and/or implicitly entered information and automated responses thereto, and/or status of the system, e.g., responsive to the tasks presently executing on the system.

Therefore, according to the present invention, filters need not be absolute, such that in the aforementioned example, an otherwise relevant response to a query need not be excluded simply because it contains words which are likely indicative of a real estate listing, if the response is otherwise material.

This, of course, raises the issues of competing and cooperative filters. According to the present invention, an intelligent decision may be made dependent on outputs of a plurality of semantic, taxonomic, or other types of filters. Of course, a rigid filter rule, such as a "smut filter", may also be established within the same framework.

In some instances, a predetermined taxonomy is insufficient to finely granularize the set of results returned. In addition, the user may not be able a priori to classify the results without first examining them. In these sorts of instances, it may be desired to automatically classify documents into subsets of records of reasonable number. Thus, a relatively large set of objects responsive to a query may be automatically analyzed to determine common characteristics and categorized into mutually exclusive (or reasonably so) subsets thereof. The system may then define these distinctions as temporary (or permanent) taxonomic classifications. The user may then review these derived classifications, generated based on the content of the objects, or the objects therein. The automated classifications may also provide extrinsic distinctions, e.g., commercially motivated distinctions, rather than purely intrinsic content related distinctions.

As discussed above, the recently relevant portions of the taxonomy may be cached by an applet or helper application, and therefore these cached portions may include the derived taxonomy. Typically, the artificial taxonomy may be difficult to automatically integrate into a predetermined taxonomy. In that case, the system may offer the user the opportunity to manually define a taxonomic relation of a new or artificial taxonomic classification. Preferably, this opportunity is presented asynchronously with other requests of the server. Further, the applet may organize and defer such tasks. In fact, the applet may assist the user in organizing information extrinsic to the searching system, so that the user's available information base, from multiple sources, is coherently organized.

In a preferred embodiment, a taxonomy may be defined based on a commercial or industrial interest. Thus, the system according to the present invention may be applied to catalogs and specialized databases. Further, the taxonomy may be defined as a set of nodes, each node representing a different resource. For example, in an electronic (on-line) commerce system, each vendor may be represented as a node within the taxonomy, based on the products or services offered, client profile, and other factors, such as a priority rating. Therefore, the user may be presented with a plurality of potential taxonomic systems, depending on an initial interaction with the system. The user may initially indicate that he or she seeks to purchase an item. Therefore, the taxonomy selected will relate to goods for sale. In that case, a particular item offered within the system may ultimately have a plurality of taxonomic classifications, depending on a path the user takes. In other systems, the taxonomy is constrained such that no item may be classified more than once. An example would be linguistic searches, wherein a single "meaning" for a search term is desired, and the taxonomy defines the meaning.

Certain parts of the taxonomy might be made available on a commercial basis. For example, under automobiles, American automobiles, there might be a portion of the tree with Chrysler, under which might be sports utility vehicles (SUV), trucks, cars, and under sports utility vehicles might be Durango and Cherokee, where this inset in the taxonomy is paid for by the manufacturer or distributor on a fixed fee for view or click-through basis, or a combination of these approaches. The advertiser would know that a person entering its portion of the taxonomical tree really wants to see this particular product or aspect of its business, which should command a premium fee or click-through charge. To maintain integrity with the users, the paid portions of the taxonomy could be differentiated with a distinguishing typeface or color, could be outlined as commercial, or otherwise differentiated, to separate commercial and non-commercial portions of the taxonomy. In other cases, the probability of a user responding in the desired way to the ad is not exceedingly high. In that case, the cost per impression could be lower, or a higher valued ad substituted. The advertising rates may therefore be variable, and even computed according to a continuous formula, based on the characteristics of the user, the present search and past history of the user, and possibly other factors, for each imprint or user.

In the same manner, premium content, i.e., information objects that are available only by subscription or through payment, may also be highlighted and/or segregated from free or basic content.

The taxonomy may also include a hybrid representation, especially where commercial subsidies are a factor. Thus, where a user is "shopping", the interactive search process is purely of a commercial nature, and is optimized accordingly. This optimization may be such as to maximize revenues for the search engine proprietor, or maximize sales profit for the vendor. On the other hand, where the user seeks "content", rather than to purchase, the process may be subsidized by seeding the visual displays presented to the user with advertisements. Preferably, these advertisements are targeted to the user, for example based on the search premise, an imputed user profile or set of characteristics, or an identification of the user. Thus, for example, relevant commercial elements may be interposed in the taxonomic structure of the content. Alternately, banner ads may be provided, associated with the content displayed, the user, or otherwise to the process in which the user is involved.

This commercially subsidized portion of the information may be subjected to various filters, limits and compensation attributes. Thus, a user may wish to avoid all extraneous information, at the cost of usage fees, subscription payments, or other model for compensation of the service provider. Likewise, the amount of sponsor information may be limited, either at the server transmitting the information, or at the client system.

Revenue Models

A further aspect of the invention relates to revenue models, which may be defined, based on the advanced functionality of each respective system. For example, in the process of defining user characteristics for the system, the user conveys valuable information about himself. This information may be used, for example, to define, on a general level, a set of products and services in which the user may be interested. This information may be used internally within the system, or sold to marketing concerns, as permitted by the user, usage agreement, regulation and law. Advantageously, the system "tests" hypotheses by requesting feedback from the user relating to generalizations and specifications that are made. Thus, the function of defining the characteristic of the user may be enhanced through cooperation of the user. The benefit to the user of allowing these characteristics to be ascertained will be tangible and immediate, so the user will likely not object. The value of this data, in turn, may be returned to the user, in whole or part, by monetary remuneration, subsidy for search activities and/or reduced "search costs" for items of interest to the user.

Since a significant cost in Internet searching involved retrieval of query responses, by narrowing a scope of a search, it is possible to reduce the costs by limiting the information which must be delivered. Further, the value of the identification of a user characteristic, especially with the confirmation of similar interests, based on acceptance of the group presumptions made by the system, is high, especially for marketing purposes. Therefore, given the potential cost savings and information value, the system may provide substantial incentives to the user to cooperate with the information gathering process and to frequently use the system. These incentives may take the form of monetary rewards, coupons, bonuses, contests and random drawings, or improved content or service. These incentives may be allocated and provided in known manner.

Typically, the incentives are allocated according to profit to the proprietor of the database interface system. The greatest opportunities are, indeed, where the user conducts an e-commerce transaction through the portal, wherein the portal is compensated for delivering a willing and able purchaser to a vendor, or wherein the portal itself is the vendor. Therefore, the preferred primary basis for incentives is e-commerce transactions completed. A secondary basis for revenue to the portal includes advertising revenues, typically on a per ad impression or click-through basis. In this case, the proprietor desires mere use of the portal, and primary incentives may be provided, such as a set of useful services, as well as secondary incentives, such as rewards. These services may include, for example, personal shopping or information gathering agents, news feeds, e-mail, personal home page or web sites, electronic wallet services, best price services, consumer review services, on-line auction systems or auction monitoring systems, chat rooms or chat room monitoring services, and the like.

It is well known that by optimizing the presentation of advertising to potential consumers, a higher effectiveness of advertising will be achieved, termed the "ad response rate." It is believed that the probability that a potential consumer will purchase a particular item is correlated with certain personal characteristics, including demographic characteristics, of the person or family unit. The field is called demographically targeted advertising. Thus, by predicting the ad response rate for a person, the most highly valued advertisement may be selected for the person. This optimization allows the service provider to charge a higher ad rate, while the advertiser gains more effectiveness for marketing dollars.

Accordingly, one aspect of the invention provides that a conditional probability of a subsequent action by the user may be assessed for each interaction, and that, on the basis of that probability, an economic parameter altered. Thus, for example, the selection of a hyperlink by the user through a browser may be associated with a calculated probability that the user will subsequently purchase a good or service. This probability may then be used to calculate an advertiser charge for delivery of an advertisement, or to prioritize the advertisements sent to the user in order to, for example, maximize the utility to the selected advertiser, the advertisement serving system operator, to the user, or some combination thereof. This calculated probability may also be used to adapt the information subsequently presented to the user. This probability may be calculated, for example, based on a population statistic plus a recent history of the particular user, a collaborative filtering scheme, a long-term monitoring of the user through the use, for example, of cookies and a database, or other scheme, or through express input of user characteristics, such as demographic profile, survey response, or a direct user communication. The logic used to predict the probability may be formal Bayesean, fuzzy logic, a multiple regression equation, neural networks, or other known logic. Further, the probability calculation algorithm need not be completely accurate, so long as it produces an output more accurate than a random selection; however, since an economic valuation is placed on the result, a more accurate calculation will likely be considered more valuable in the marketplace.

It is noted that the advertisement need not be limited to efforts to cause a consumer to purchase. In fact, advertising, as considered herein broadly encompasses seeking to influence a user. Thus, the decisions made by the user need not be purchasing decisions. However, typically, an economic model is appropriate. For example, in a corporate Intranet, messages transmitted to users may be internal messages from within the network, for example informing users of new corporate capabilities, resources, or initiatives, or of changes. According to the present invention, these messages may be delivered in a context-sensitive manner, and based on a user profile. Of course, as in standard consumer advertising, messages may be targeted even to those persons who subjectively resist being so informed, but nevertheless are intended targets of the message. Advantageously, such internal messages may be subjected to an accounting system, wherein a real or imputed economic transfer occurs, for example in the manner of an auction, seeking to maximize the efficiency.

U.S. Pat. No. 6,014,634 (Scroggie, et al.), expressly incorporated herein by reference, relates to a system and method for delivering purchasing incentives and the like to a user, especially using a cookie and associated personal web page.

U.S. Pat. No. 5,974,398 (Hanson, et al.), expressly incorporated herein by reference, relates to a system that allows advertisers to bid for placement in front of particular users based on customer interest profiles.

U.S. Pat. No. 5,933,811 (Angles, et al.), expressly incorporated herein by reference, relates to a system for delivering customized advertisements within interactive communications systems.

U.S. Pat. No. 5,991,735 (Gerace, et al.), expressly incorporated herein by reference, relates to a computerized system for determining a user behavioral profile. This profile may be used, for example, to demographically target advertisements.

Guided Browsing

The use of this information structure therefore presents another particular aspect of the present invention, that of guided browsing. Therefore, the user examines objects using known techniques and systems. The system according to the present invention need not replicate or encompass resource for all such objects. The emphasis of this aspect of the present invention is therefore to facilitate identification of relevant objects through intelligent analysis and information presentation techniques, including, for example, hierarchal or taxonomic organization.

It is noted, however, that the system and method according to the present invention may be integrated with standard object browsing software, such as Microsoft Internet Explorer or Netscape Navigator. For example, custom frames or codes within the command line may invoke particular functions of the present invention. The hierarchal organizational scheme may preempt the standard favorites organization. Of course, the present invention is operable without such integration, and indeed is operable in many instances without a standard object browser at all. In either case, the user is typically given an option to employ standard tools or those enhancements provided by the present invention. Further, many features of the present invention are modular, and need not be employed as a complete set. This is especially the case where features are implemented as sets of small applets, invoked as necessary.

An important trend in the development of the World Wide Web has been the growth of communities, which are web sites organized to encourage communication among groups of people sharing common interests. Such communities have been found to provide an attractive environment for specialized advertising and commercial sponsorship. It can be readily seen that the use of maps and other means for presenting relationships between objects according to the present invention lends itself to the recognition, organization and maintenance of communities. Indeed, the nodal map could be represented somewhat analogously to a demographic map, in which the activity of nodes could be analogized to the size of cities. On an ordinary map, an ordinary village would be represented by a tiny dot, and a large metropolis represented by a larger dot or circle. Analysis of such a map could help provide users an opportunity to initiate or expand a community, or for a service provider with access to such information to stimulate or encourage such a community. Therefore, it is an object of the invention to analyze user profiles, for example taxonomic maps, to define a user's interests, or activities, which may then be used to identify communities which relate to those topics. The user may then subscribe to those communities.

Presentation of Results

After a query is defined, the system may return a large amount of information. Therefore, a proportional burden of information not specifically requested by the user may accompany the download, for example banner ads. Advantageously, however, the user may be provided with options relating to the types and amount of such additional information, and its manner of presentation. Therefore, a variable cost and/or subsidy scheme may be provided.

Once relationships are determined, the output may take any of a number of forms. For example, a tree structure may be created, populated with the available document set. A multidimensional cluster map may also be generated, with trivial dimensions collapsed to give the most useful output image. Thus, discrete, continuous or hybrid techniques may be used for data representation. In a preferred mode, a high level analysis segregates documents based on discrete criteria, such as a taxonomy, although at this level, a single document may be represented in multiple discrete segments. Within each segment, the documents are represented in a continuous map, the presentation of which may be altered by the user as desired to best distinguish the documents of interest.

Using this type of analysis, it is also possible to implement an efficient vector-quantized data compression scheme, based on the common sequences within proximate documents within the hierarchy. Duplicate files would be most efficiently represented. Thus, a series of documents representing a series of drafts of a document may be analyzed to produce a representation of the group as an edit history. This edit history may not only represent the entire set, but in many instances provides a useful organization of the data, including common ancestor documents, draft evolution, and individual contributions.

Digital Rights Management

In fact, some objects according to the present invention include information belonging to third parties, or with intrinsic restrictions on redistribution. An example of the first type of information is demographically targeted advertisements, which may be defined specifically for the initial user, and which may include incentives or other information or rights not intended for the general public. An example of the second type of information is copyright protected data, for which a limited license is provided to the original user. In each of these cases, a rights management module may be provided to limit the retransmission or reuse of the portions of the object in accordance with the accepted or imposed restrictions. This rights management module may also respect indications of confidential information in the object, and either delete, modify or substitute information for those restricted portions before transmission.

In many cases, the restrictions will encompass an economic interest or otherwise require a relatively simple negotiation to remove the restriction; in those cases, the rights management module of the transmitter or receiver may negotiate for the rights, using, for example, a known micro payment scheme, e.g., Micro Payment Transfer Protocol, or other appropriate communication, to secure necessary rights for the data. In other cases, such as demographically targeted advertising, the acquisition of rights may entail substitution of advertising based on the recipient's profile, rather than the originator's profile. This later updating may be performed adaptively through use of the object, for example by the object, during use, communicating with an advertising server to provide the appropriate information. Thus, a rights management module may be a part of each client system, for assuring appropriate and consistent use of data and objects.

The rights management module may be, for example, embedded within the host operating system, within the host application, e.g., the JAVA Virtual Machine or Internet browser, within a remote server which interacts with the objects, or as a separate and possibly obligate applet residing on the client system. Alternately, rights management functions may be embedded within each application or applet interacting with objects subject to restrictions.

In fact, the rights management module may be a separate system, and multiple rights management systems may be present, depending on the particular restrictions. In this case, the applet which interacts with the object determines a rights status for information, as well as a rights management method identification, and communicates the necessary information to the appropriate rights management module. In one case, an honor system may be implemented, in which a user may have access to the information outside the scope of the applet, in potential disregard for imposed restrictions. In another case, the information is protected, and requires successful completion of a rights management clearance for release. In this case, the information is typically encrypted, with the necessary information for decryption provided only upon rights clearance. Alternately, a micropayment scheme may be implemented, potentially locally, with a secure accounting system. In the micropayment scheme, typically a direct communication between creditor and debtor is not required; rather, the transaction produces a result which eventually results in an economic transfer, but which may remain outstanding subsequent to transfer of the underlying goods or services. The theory underlying this micropayment scheme is that the monetary units are small enough such that risks of failure in transaction closure is relatively insignificant for both parties, but that a user gets few chances to default before credit is withdrawn. On the other hand, the transaction costs of a non-real time transactions of small monetary units are substantially less than those of secure, unlimited or potentially high value, real time verified transactions, allowing and facilitating such types of commerce. Thus, the rights management system may employ applets local to the client system, which communicate with other applets and/or the server and/ or a vendor/rights-holder to validate a transaction, at low transactional costs.

It is also noted that, while a user may have to account for rights of third parties in order to use content, advertiser or sponsor subsidies may inure to the user based on viewing or access of advertisements, click-throughs, or the like. Therefore, while funds transfers may be necessary vis-à-vis sponsors, service providers, and rights-holders, the process may be transparent and potentially no-cost to the user. In this case, the risks of tampering and fraud based on manipulation of client-system resident data and applets will generally be low, and therefore the level of security and protection of these client-resident data and applets may also be low. However, as deemed necessary, a high degree of security may be implemented, such as a hardware "dongle", secure encryption and watermarking techniques, or real-time transaction verification.

It is an object of the invention to provide a method of providing a human-computer user interface, comprising the steps of providing the user with navigational tools for defining and retrieving objects based on a resource locator thereof; providing an object search engine for selecting a set of objects according to a user-defined content criteria and returning respective resource locators of selected objects; and providing an hierarchal organizational structure in graphic format for the set of objects, wherein the hierarchal organizational structure is automatically generated based on a content of or linkage between objects. According to one embodiment of the invention, objects extrinsic to the user-defined search criteria are inserted into the hierarchal organizational structure of the selected objects. These extrinsic objects are, for example, advertisements, communications, collaborative filter-based supplementation, or the like.

According to one embodiment of the invention, objects extrinsic to the user-defined search criteria are inserted into the hierarchal organizational structure of the selected objects. These extrinsic objects are, for example, advertisements, communications, collaborative filter-based supplementation, or the like.

It is also an object of the invention to provide a hierarchical representation of a taxonomy to the user for interactive definition of a desired search scope.

It is another object of the invention to provide a computer database system, comprising a user interface, receiving a user input and presenting feedback; a memory for storing a user characteristic, the user characteristic being defined through the user input and being employed to control a domain of a database operation, while not defining a query; and a memory, for storing a user query, defining a range within the domain.

It is a further object of the invention to provide a computer database system, comprising a user interface, receiving a user input and presenting feedback; and a representation of an organization of knowledge, presented as feedback to the user, to define a contextual scope of a database operation, wherein the user interacts with said representation to define and refine a desired context.

It is also an object of the invention to provide a human user computer interface system, comprising an object examination interface, providing human user access to a selected hypertext object; and a graphic portion simultaneously representing at least three hyperlinked objects in a hyperlink hierarchy, each hyperlinked object representation being hyperlinked to the respective object for selection thereof, the graphic portion being automatically generated to represent a hyperlinkage hierarchy and graphically representing a history of access to the represented objects.

Another object of the invention provides a human user computer interface system, comprising a graphic user interface, comprising a visual display and a pointing device; and a portion of the visual display presenting a hierarchal path representing a resource locator for accessible objects, wherein a selection within the portion by the pointing device of a predefined level within the hierarchal path is interpreted to request an object corresponding to the predefined level of the hierarchal path.

It is a further object of the invention to provide an information organizational system, comprising a hyperlinked organization of objects, wherein a single object may have multiple parent objects and multiple child objects, and wherein at least two independent hierarchies are formed by respective subsets of hyperlinkages within the hyperlinked organization, and wherein the respective independent hierarchies are distinguishable for each respective hyperlink.

It is a still further object of the invention to provide a human user computer graphic interface system, comprising a pointing device, producing a signal corresponding to a manipulation by the user and being capable of producing pointing device events; and a graphic display generator, generating a graphic display representing at least two objects and a linkage therebetween, as well as a graphic cursor, the graphic display generator selectively altering representation of at least one object in proximity to the graphic cursor and altering a linkage on occurrence of a pointing device event.

Another object of the invention provides an information organizational tool, comprising at least two distinct predetermined hierarchical organizations of information each having at least three hierarchal levels for a universe of objects; means for defining a relevant hierarchy from among the at least two distinct predetermined hierarchical organizations of information; means for defining a set of objects within the universe of objects; means for presenting links to the defined set of objects according to the relevant hierarchy; and means for storing at least a subset of the presented links within the relevant hierarchy as a recallable structure.

It is also an object of the invention to provide an information organizational system, comprising a set of n independent hierarchies, each encompassing a universe of objects; a user input for selectively defining a respective hierarchy; means for selecting a focus within a respective hierarchy; means for representing the focus, objects within the focus, and hierarchal linkages of the objects within the focus; means for altering at least one of: the universe of objects, an organization of the respective hierarchy, a scope of a focus, and a ranking of objects; and means for updating the representation of the focus based on the alteration.

It is a still further object of the invention to provide an information organizational system, comprising a set of n independent hierarchies, each encompassing a distinct organizational structure of a universe of objects; an input for selecting a desired hierarchy; means for defining a set of objects within the universe based on characteristics thereof, means for representing the set of objects based on the selected desired hierarchy and a ranking algorithm, the ranking algorithm ordering objects within the hierarchal classification; and means for selecting a hierarchal subset.

A further aspect of the invention provides an intelligent agent system based on (a) a specific task defined by a user, and (b) a user profile defining general characteristics and preferences of the user. The user profile may advantageously be stored in a personal record in a server, as discussed above, or be transmitted by the client machine to an agent server directly. The specific task may be defined explicitly, or for example, employing the interactive communication scheme and taxonomic representations discussed above. Furthermore, as a representation on behalf of the user, the taxonomic nodes on which the agency is active may be visually distinguished from the remainder of the nodes by color, blink rate, highlighting, or the like. The agent may, for example, conduct database searches or updates thereof, monitor published pricing or on-line auction status, discover new items which meet a purchasing profile, or otherwise conduct transactions on behalf of and using a strategy defined by the user. The invention also provides for customized news magazines, whose contents are mapped by the nodal map of a particular user.

A still further object of the invention provides a digital rights management system, comprising an index of content having associated digital rights; means for searching the index based on a user query; digital rights management means for applying a set of digital rights rules to a result of searching the user query in a content-sensitive manner; and means for transmitting the user query result and applied digital rights rules to the user, wherein at least one digital rights rule provides a positive incentive to the user.

The present invention has as an object to provide a system for preserving digital rights in a transmissible object, comprising a plurality of distinct elements, each having an associated distinct digital rights rule, comprising means for analyzing the transmissible object to determine associated distinct digital rights rules for respective distinct elements; means for substituting at least one distinct element based on an associated distinct digital rights rule; and means for accounting for the substitution.

It is also an object of this invention to allow for monies to be received from commercial interests who wish to obtain an elaborated portion of the directory from which user selects relevant categories (a "Limb"). Such a Limb would present additional material, suggested by the advertiser or merchant, in a more elaborated way than would otherwise occur: for example, multiple levels of details about an advertisers' products, video or audio commercial messages, special offers and discounts, contests, and so forth, arranged in the Tree format. Preferably, for the purposes of informational integrity, commercial content would be separated from non-commercial content by a demarcation, such as a colored line, to avoid confusion with non-commercial content. To give a specific example, user may touch a node for transportation/automobiles/US/Chrysler Dodge/Durango. Everything beyond Chrysler Dodge would represent a Limb, a paid service. Such Limbs could also be modified dynamically in relation to characteristics of the user. For example, the Limb for a young mother might emphasize safety features, while the Limb for a user known to be a male in his twenties might stress the power and handling package.

It is also an object of the invention to provide a human computer interface system, comprising a client user interface system; a server system, capable of communicating with the client user interface system; and a user profile, wherein the server executes an operation in dependence on an explicit user command and the user profile, and wherein user profile is stored in an encrypted form which is resistant to detailed interrogation of the server.

It is a further object of the invention to provide a human computer interface system, comprising a client user interface system; a server system, capable of communicating with the client user interface system; and an applet, presenting to the user a hierarchal nodal map of relationships of information classes, wherein the server executes an operation, returning a set of information, and wherein the applet populates the hierarchal nodal map with elements of the set of information, the based on a relationship of a content of each element with a respective class definition of a respective node.

It is a still further object of the invention to provide a human computer interface system, comprising a client user interface system a server system, capable of communicating with the client user interface system, and an applet, presenting to the user an editable hierarchal nodal map of relationships of information classes at a respective level of analysis, wherein the server executes an operation, returning a set of information, and wherein the applet populates the hierarchal nodal map with elements of the set of information, based on relationship of a content of each element with a respective class definition of a respective node.

Another object of the invention is to provide a human computer interface system, comprising a client user interface system, a server system, capable of communicating with the client user interface system, and an applet, presenting to the user a map of relationships of information classes, wherein the server executes an operation, returning a set of information, and wherein the applet populates the map with elements of the set of information, the based on relationship of a content of each element with a respective class definition, and wherein elements of the set of information within a regional cluster are priority ranked.

It is also an object of the invention to provide a human computer interface system, comprising a client user interface system, a server system, capable of communicating with the client user interface system, and a user modeling applet having encrypted user modeling data, wherein the server is controlled by a user query and the user modeling applet, and wherein a key is required from the user to access the applet.

It is a still further object of the invention to provide a human computer interface system, comprising a client user interface system, a server system, capable of communicating with the client user interface system, and an adaptive user profile applet, comprising a collaborative filter for initial classification, which subsequently is modified based on user observation, wherein the server executes an operation, returning a set of information, based on a user query and the applet.

Another object of the present invention is to provide a method of protecting privacy rights of a user, comprising the steps of receiving private user information from the user, processing the private user information within a privileged environment to produce a public key-private key encrypted algorithm, wherein the public key/private key pair is associated with a user, and transmitting the encrypted algorithm to the user.

A further object of the invention is to provide a method for filtering user queries, comprising defining a user taxonomic hierarchy of interests, correlating the user taxonomic hierarchy with a set of references taxonomic hierarchies, and modifying the user taxonomic hierarchy based on sets of rules associated with a reference taxonomic hierarchies having high correlations.

Another object of the invention is to provide a human computer interface system, comprising a client user interface system, a server system, capable of communicating with the client user interface system, and means for defining a hierarchal cluster map of data elements retrieved by the server system, and transmitting a cluster density of the cluster map to the client user interface system, wherein a hierarchy of the hierarchal cluster map is alterable.

Finally, it is an object of the invention to provide a human computer interface system, comprising a client user interface system, a server system, capable of communicating with the client user interface system, and means for defining a hierarchal cluster map of data elements, and transmitting a cluster density of the cluster map to the client user interface system, wherein a hierarchy of the hierarchal cluster map is supplemented by context-appropriate advertising.

In many instances, the invention according to the present invention builds on themes and concepts of the prior art. It is understood that the herein discussed references therefore disclose elements and implementations of portions of the invention, and include disclosure of elements and implementations which could be modified in express accordance with the teachings herein.

These and other objects and features of the present invention will become more fully apparent from the following description and appended claims taken in conjunction with the accompanying drawings, in which like numerals refer to like parts.

DETAILED DESCRIPTION OF THE PREFERRED EMBODIMENTS

Figure 1A:
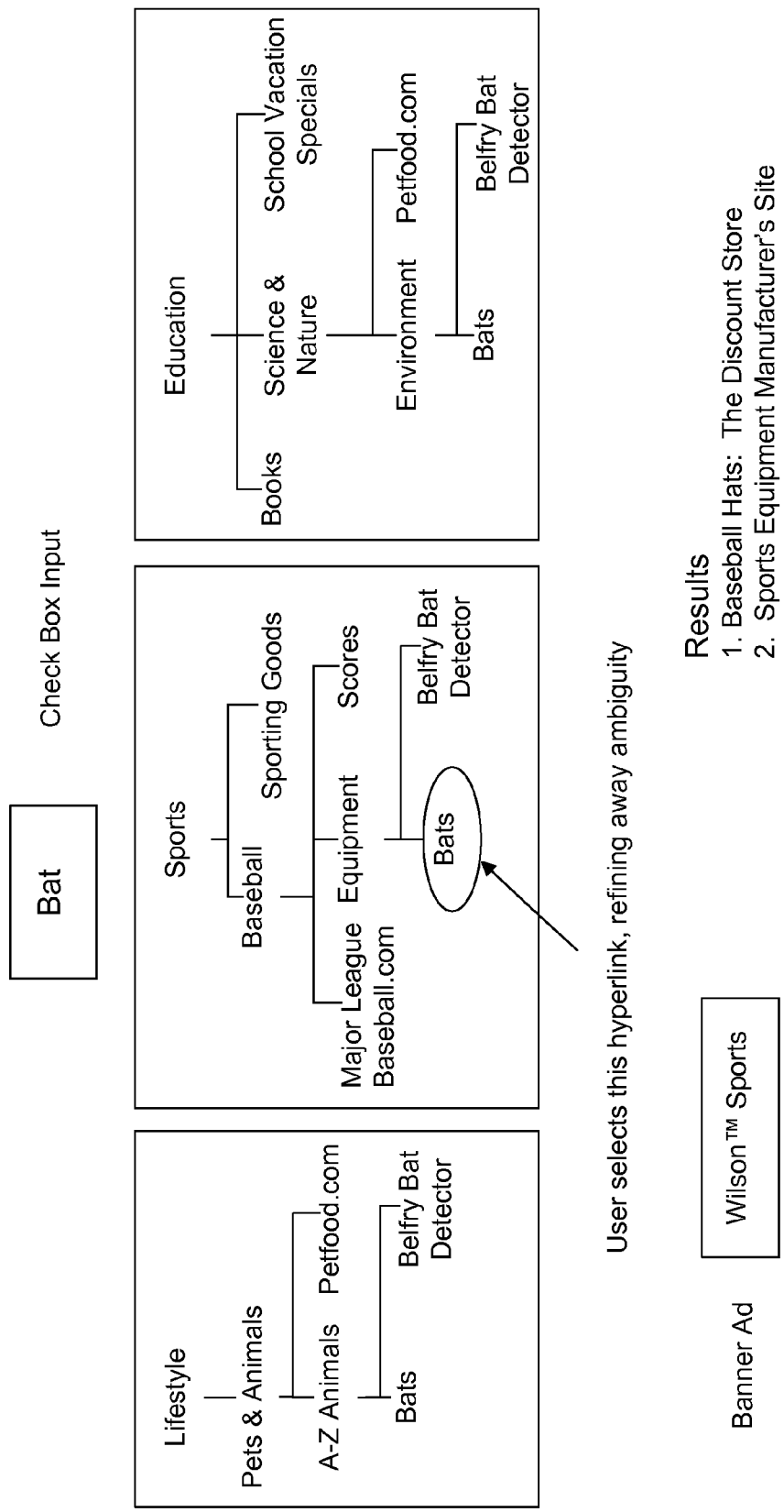
FIG. 1A shows an ambiguity resolution input scheme.

The invention will now be described by way of the drawings, in which corresponding reference numerals indicate corresponding structures in the figure.

EXAMPLE 1

The user's query may be used to implement suggested relevance zones, which will be in effect zoomed-in views of a portion of a taxonomic tree. From these views, which will be displayed in the manner of a family tree within bounded areas, probably rectangles, the user will select portions that are truly relevant to the query. See FIG. 1A. These zoomed-in views would preferably be arranged in order of apparent descending relevancy. If the views are too numerous to fit on a single visible page, they may be allowed to run to further pages, with an alert to the user preferably given, but the portions most likely to be relevant should preferably be displayed on the first page. Nodes on the taxonomy that are predicted to be potentially relevant could be identified by a difference in color, a heavier impression of ink or different style of the same color, as for example a large dot, concentric circles, or other such symbolism. A degree of predicted relevance may also be shown by degree of color saturation, or through a color code, as in the case of so-called "heat grids" or other pseudocolor representations.

As shown in FIG. 1A, a user's choice of a particular node(s) tends to refine away (distinguish) ambiguity, which would otherwise be inherent in the use of most natural language words and phrases and many proper names. As a commercial model, this method presents several compelling advantages. First, the user has uses two "click-throughs" at a minimum to complete any search. Since the convention of banner advertising on the web tends to pay per impression on a click-through basis, the search engine business will receive two distinct impression payments in this way. Second, and more significantly, the second click-through tends to define what user "really means" by excluding at least provisionally other often plausible alternative choices that user "might have meant." The implication for context sensitive advertising is that the search engine in principle should be able to charge more for the second click-through on a per impression basis, as the context of the context is usually much better known in that case, which would tend to predict higher than average click through rates on the banner ad, in that the ad may likely be more pertinent or less offensive to user's true interest.

Figure 9:
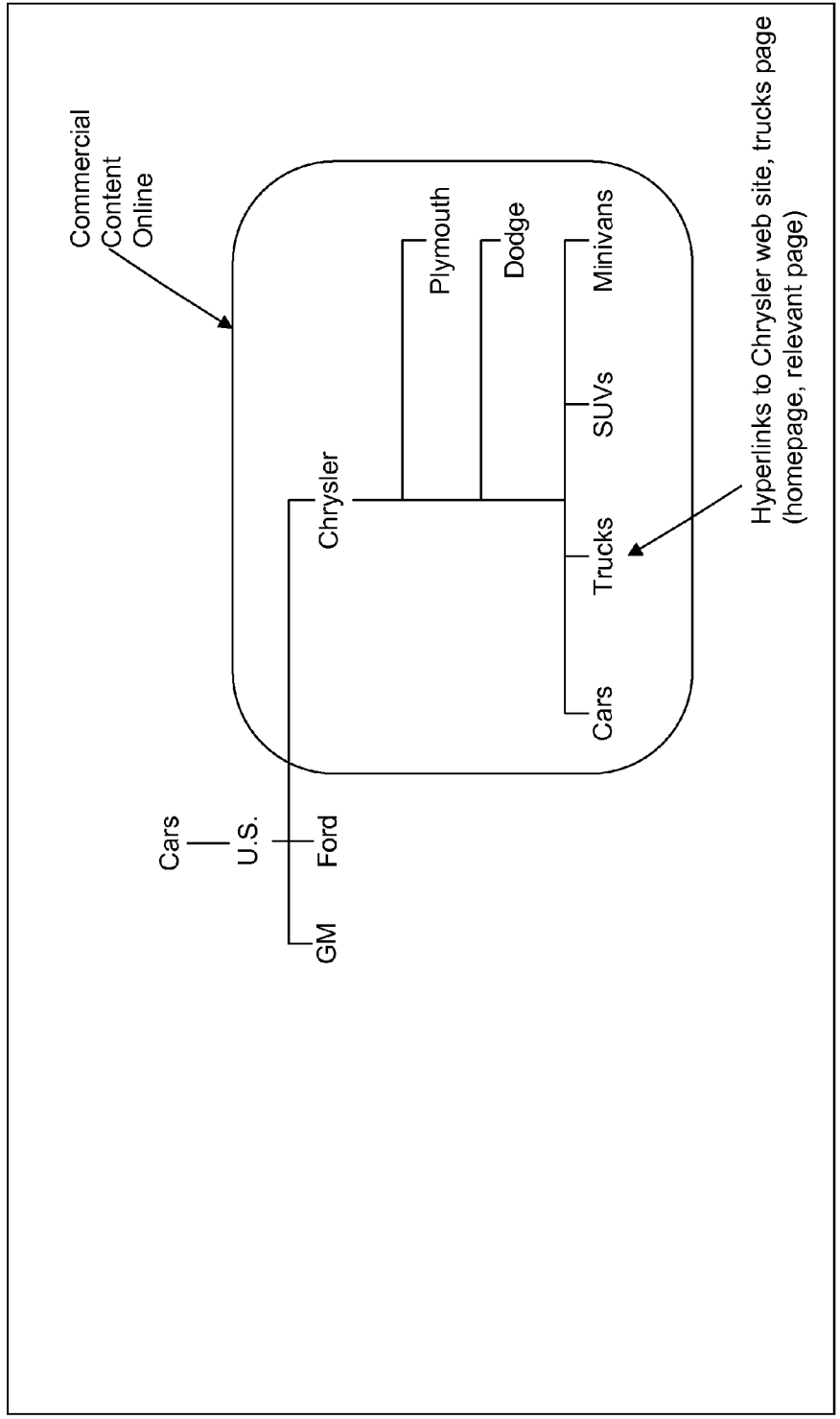
FIG. 9 shows elaborated commercial content embedded within a nodal network.

In FIG. 1A, the listed hierarchies have been supplemented with associated advertisements, as a means for subsidizing use of the search engine, and to possibly meet the need of the user, even though not defined by the search query. Thus, for "Pets & Animals", "petfood.com" appears, and thereunder for "bats", "belfry bat detector" appears. Under "sports", "sporting goods" (a hyperlink) appears, while under "baseball", "major league baseball" and "scores" appear. Under "education", "books" and "school vacation schedules" appear, while under "Science & Nature", "lab supplies appears". Thus, in this case, there is a contextual relation between the supplemental information and the taxonomic class. This same type of supplemental information appears in FIGS. 1B, 1C, IE, 2, 4, 5, 7, and in more detail, in FIG. 9.

In general, this advertising targeting is developed in two ways; first, based on the context alone. Clearly, if the material was directly related to the taxonomy, then it would be naturally classified in that position, and it would not be supplemental in nature. Rather, a set of rules or associations are provided to link sponsored links with taxonomic content.

Figure 4:
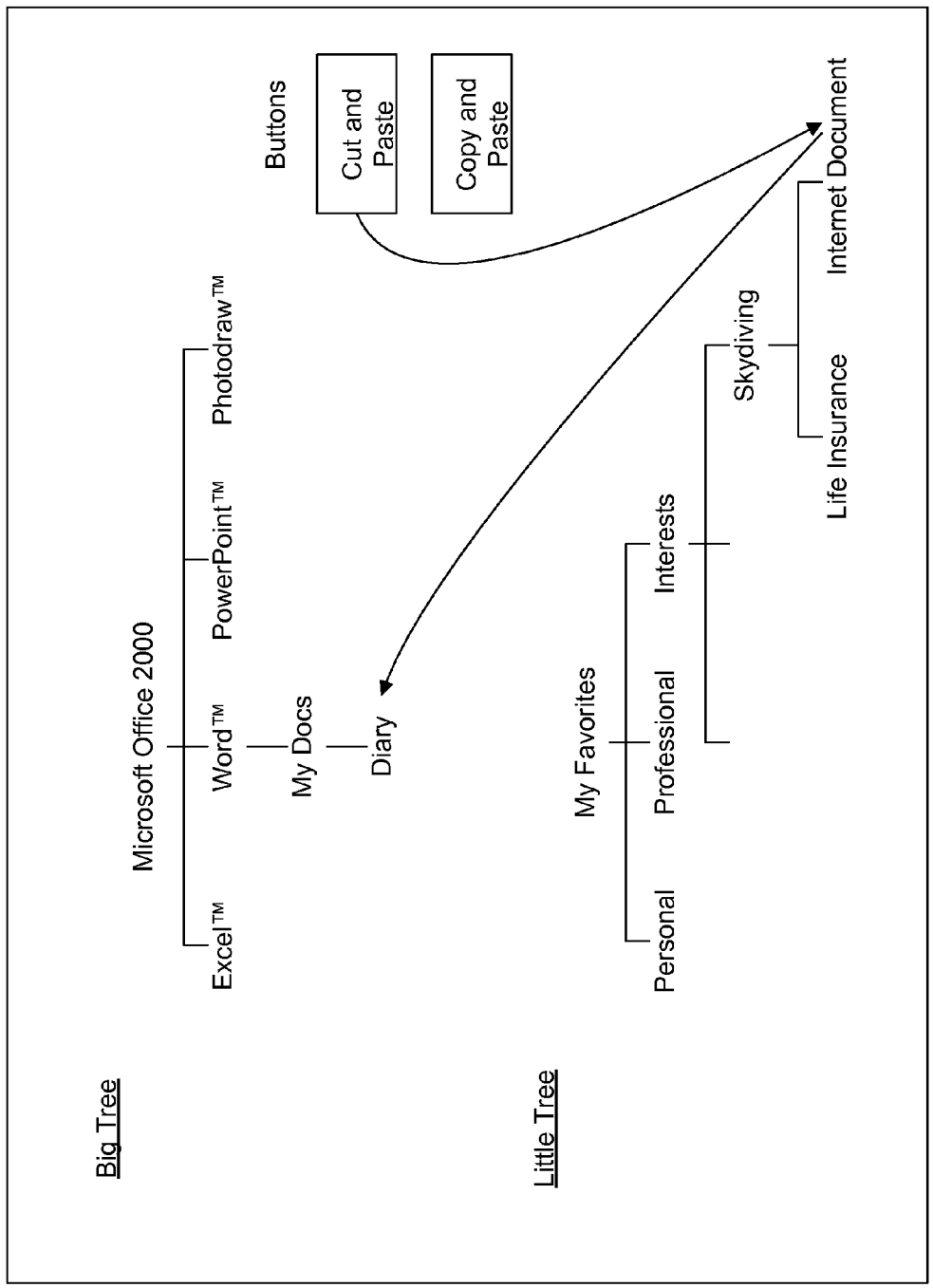
FIG. 4 shows use of the nodal network as an organizing tool.

A second method, preferred herein, is to employ collaborative filtering to determine which supplemental information to display. In fact, this collaborative filtering, i.e., predicting the future actions of a particular user based on historical data for a population similar to the user in salient characteristics. In this case, the system does a better job of predicting an effect of the presented information. In the best case, the system would incorporate both the historical information from the collaborative filtering technology, plus the historical information about the user's own history, plus information about user's demographic information and known preferences, plus information about the content and context of user's current query or session. In terms of a multivariate equation, the probability that user will buy a particular product could viewed as predicted these three factors plus an error term. Thus, in a collaborative filter based system, the nodal supplementation may be (but need not be) based on the context, as well as a set of actions by other persons, similar to the user. Therefore, as shown in FIG. 4, users whose interests include sky diving may have interest in purchasing life insurance, and therefore the contextual relation may be distant, but nevertheless strong.

In one embodiment, a visual screen display generated during interactive use of the system to define a context within the taxonomy. Dual panes are provided, for example, to represent an ambiguity, for example between the word bat, meaning a flying rodent, and bat, a piece of sports equipment. In the left pane, a biological taxonomy is represented, with bats being one class of lying rodents, while certain squirrels being considered another class. Individual species are defined at the lowest level. In the right pane, the highest level is sports, while the middle level is represents distinct sports that employ bats, e.g., hardball and softball. At the lowest level is sports equipment, which would include bats. It is noted that the relevant taxonomy need not represent the context at the same level in each instance, i.e., bats are at the mid-level on the left and lowest level on the right. Further, on the right, a bat might be represented as sports equipment under both hardball and softball, even though the bat itself might be identical. Thus, a formal rule of taxonomy that each object has a single classification is not required.

In the case of certain other search engines offering taxonomic categories, such as Yahoo.com, the user may, entering a query having large numbers of hits, receive back a list of categories and subcategories from which user may make a selection. For example, if one types in "steel" in the clue box, one is offered a choice of directory topics such as the one that follows:

Business and Economy>Companies>Manufacturing>Metal Working>Steel

Business and Economy>Companies>Industrial Suppliers>Materials>Metals

Business and Economy>Companies>Construction>Metals>Steel Framing

These categories allow users to select a portion of the taxonomically organized materials to access. However, they do not allow user, through any gesture, to see additional siblings or children. In contrast, the invention, in a preferred form, allows user, through a gesture, to "open up" the categories in order to see corresponding siblings, additional descendents, and/or more remote ancestors. Preferably, this viewing is provided by a very simple gesture, of which an effective one would be that a pointing device, if roaming over a portion of the taxonomy, pauses for a certain interval of time, such as one second, would then cause siblings to open up. For example, suppose, according to View 1 of FIG. 1E, that one wishes to see companies other than construction; one would hold the pointing device over "Construction" until siblings appeared, as shown in View 2 of FIG. 1E. In this way, the taxonomic categories, rather than being analogous to a "dumb computer terminal" view, are actively available to explore new knowledge from the taxonomy itself rather than through hyper-link to the stated categories. Such exploration of the taxonomy, particularly in conjunction with the knowledge of the size of each node, as illustrated in FIG. 1D provide valuable information and feedback to the user.

According to an aspect of the present invention, the user may "hover", or hold the graphic cursor near a screen object, to trigger a change in display, such as a change in local detail, rather than requiring a mouse click or other discrete event. With such hovering, the user can increase displayed detail to see siblings, parents, and dependents. This isn't possible, in fact, is inherently impossible perhaps, in a single root file folder paradigm. When a mouse click is triggered, a new range of vistas may be brought into view, which also can be hovered over.

In contrast to the Yahoo.com approach, the present invention suggests the improvement of creating an outline or conceptual cluster map, to eliminate many redundancies and therefore improve readability while creating a less crowded screen through the device of displaying a zoomable nested nodal network. See FIG. 1B.

Figure 1B:
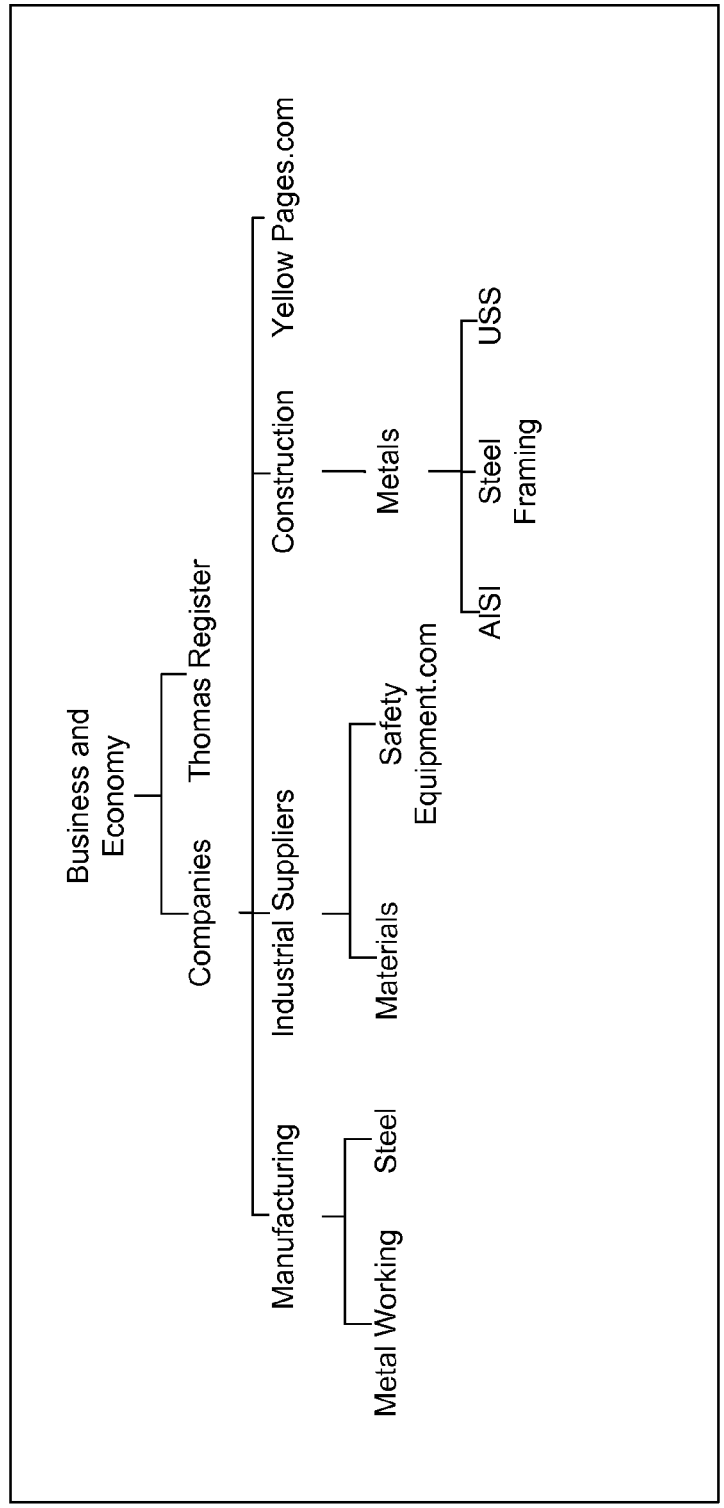
FIG. 1B shows a nodal network.
Figure 1C:
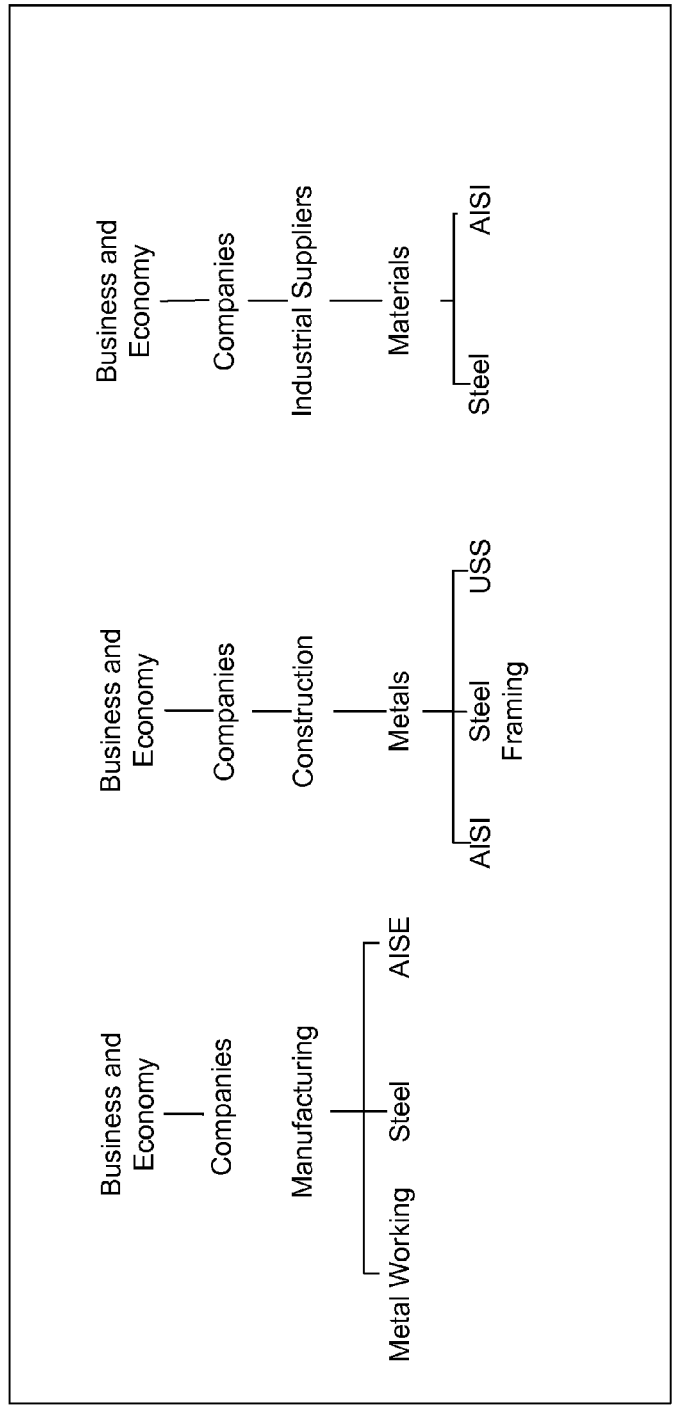
FIG. 1C shows conjoined taxonomic views.
Figure 1D:
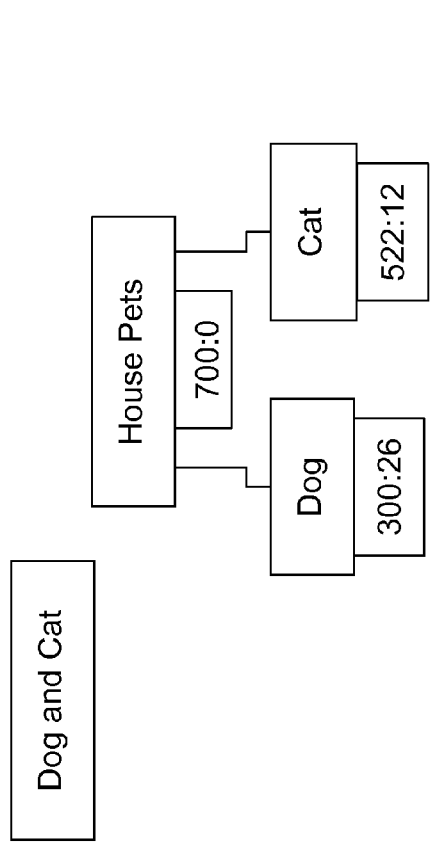
FIG. 1D shows size guidance of a search.
Figure 1D:
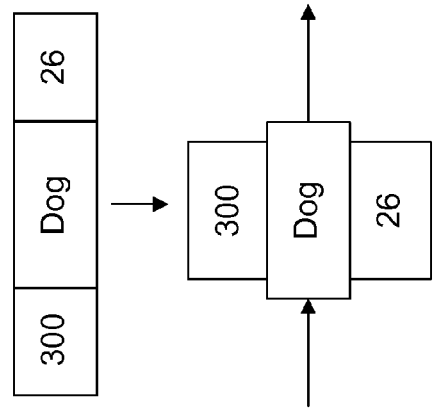
Figure 1E:
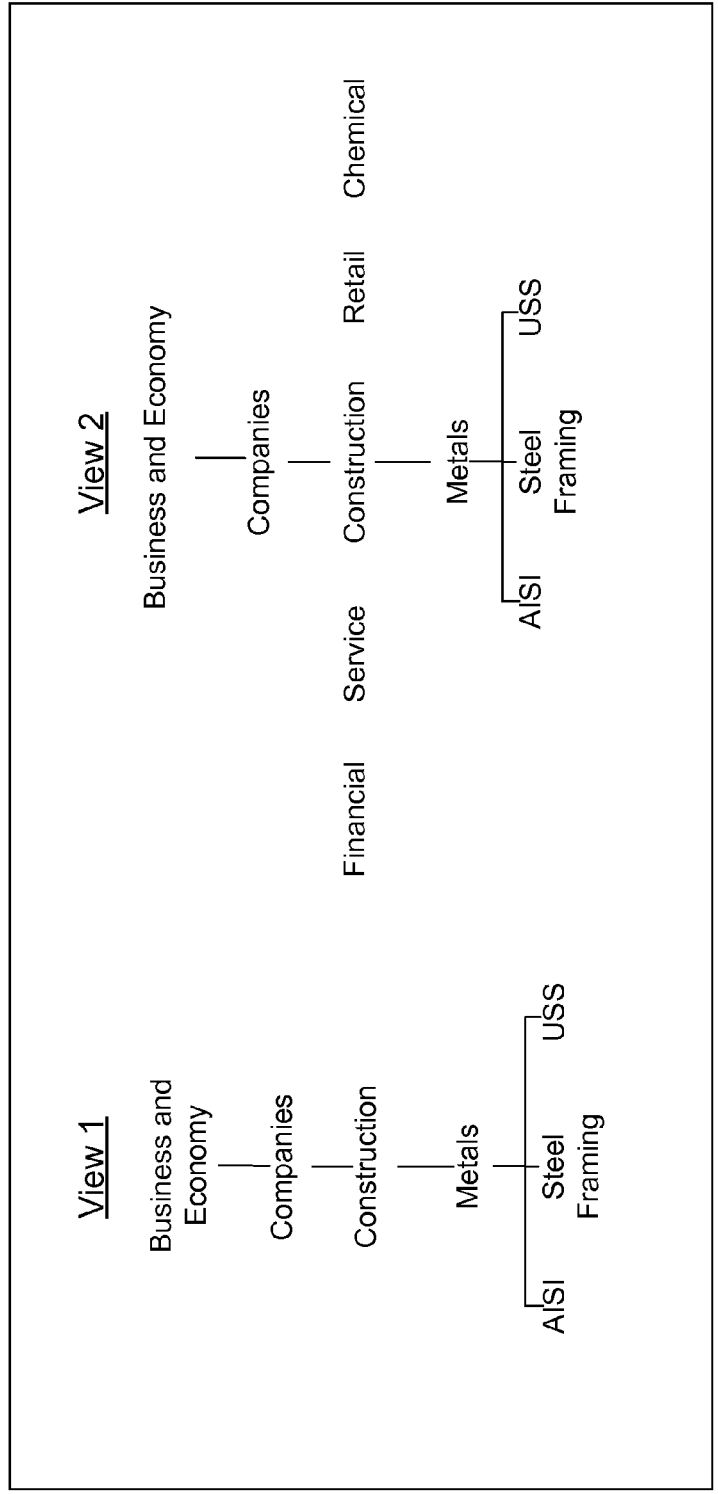
FIG. 1E shows levels of hierarchies.

Another approach, slightly different from FIG. 1B, is shown in FIG. 1C. In FIG. 1C, zoomed in taxonomic views are only conjoined when more than one possibility exists for a relevant node at a single level of generality.

The invention may also provide that user's choice of a node or nodes within a taxonomic tree provides a useful discrimination, not only as to indexed materials classified by that taxonomy, but also relating to other materials not indexed in that, or associated taxonomies, but nevertheless digitally retrievable. This bonus discrimination is preferably implemented by intelligent selection of concepts and keywords from nodes the user selects, or from pages or web resources corresponding to or near those nodes, from which keywords and concepts are extracted, for example by a summarization procedure, which will be used to enhance a user's prior search query or define a new one. Therefore, for example, user's query might be "sports", but user selects the taxonomic node "baseball", or a web page in which the word "baseball" is prominent; user's query string might profitably be expanded to "sports AND baseball," or just "baseball," for the purpose of a search of other materials, for example, through a metasearch procedure of other search engines. By a like procedure, OR conditions and NOT (dissimilarity) might be appended to user's query, or used to modify user's query, or replace user's query, to enhance such a follow-on search. Thus, for example, by beginning with a process of directory selection, user gives valuable information that powerfully amplifies and specifies searching outside of that directory.

In a preferred form, the tree views presented to viewer are expandable. For example, under the same string where Yahoo.com gives Business and Economy>Companies>Construction>Metals>

The user of a system in accordance with an embodiment of the present invention is presented with a zoomable nested nodal network in which "metals" is the bottom node. See FIG. 1E. In View 1 of FIG. 1*e*, each level of the hierarchy holds one instance. The user decides what he is really interested in exploring is various company types. The user gestures, for example by holding a pointing device over the word construction (the child) until a view appears of the siblings of "company," as shown.

This functionality requires, within a traditional browser, an applet that responds to pointing device actions in the absence of events button depressions. The applet may present for viewing locally cached hierarchal data, or automatically request this from the server. See, e.g., U.S. Pat. No. 5,964, 836, expressly incorporated herein by reference.

As to nodes of the taxonomy, the preferred embodiment of the invention provides that one, two or three of the following numbers be present at all or many nodes of the taxonomy: (a) the total number of instances of database elements corresponding to this node (either real time count or a recent number), (b) the total number of database elements apparently relevant to the query corresponding to this node, and (c) the total number of apparently relevant instances in sum within any of the nodes. These numbers could be presented as a couplet, as in FIG. 1D, with the total number of relevant instances presented a single time, for example, in a box above the taxonomic tree. These numbers might be of great value to a user in determining when to open up hits. If the number of all instances, or of apparent relevant instances, is "just right," user may then turn to opening it; if too few, back up a step or two; if too many, carry on with further steps. This technique is relatively efficient with respect to database server usage, wherein retrieving hits incurs a major cost, while tallying potential numbers of hits is relatively low cost; that is, identifying a number of potentially relevant hits references the index volume only, while retrieving records requires access to the entire database.

The invention also contemplates, as an alternative to a strict "full-zoom" view of a portion of a taxonomic table, a hybrid zoomed-in, "fish-eye" view, as with the fish-eye lens of a camera. Such a representation may include hierarchical clustering, whereby nodes are grouped into clusters, and clusters may themselves be placed into other clusters. Users can then navigate these clusters until a desired level of resolution or scope of content is reached. The fish-eye view can then be produced by a special "variable-zoom" algorithm, as described in D. Schaffer et al., "Navigating hierarchically clustered networks through fisheye and full-zoom methods," ACM Transactions on Computer-Human Interaction, Vol. 3, No. 2 (June, 1996), pp. 162-188.

The present system not only permits visualization of multiple roots simultaneously, but can also use visual tricks to create an impression of focus, just as with ordinary vision. This could be a fish-eye effect, blurring on the edges like peripheral vision, bolder type or larger size or different colors for focal points. Several focal points may be viewed simultaneously. Further, focus can be changed by a hovering action rather than generating a pointer event (mouse click).

Figure 2:
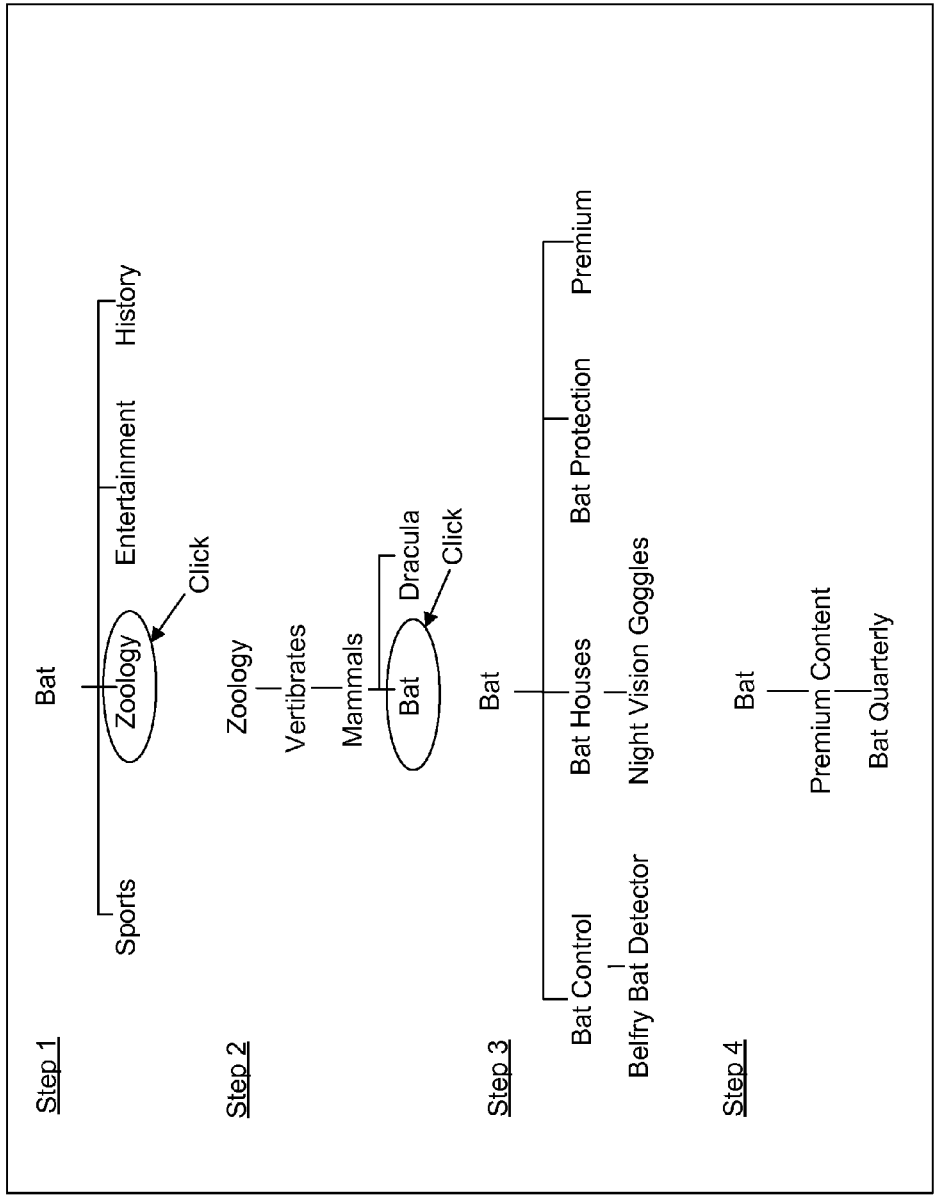
FIG. 2 shows a multi-step categorical query definition.

Of course, the process by which a user defines a node or nodes of interest within the taxonomic categories need not be limited to a single step. See FIG. 2. As the user selects nodes of interest, further taxonomic choices are presented. These choices could be more detailed instances of the subject that fall below the visible entries shown and are opened up for more detailed examination. Alternatively, these new taxonomic representations could be miscellaneous elements of the database that may be of interest to the user. One basis for predicting such collateral elements that might be of interest to user would be a model based on collaborative filtering of others users' interests; for example, of those users who have shown interest this node (these nodes), what other nodes were of interest to them? The contributions from such other users might be based on their explicit or implicit recommendation. The process of laddering down or around categories would be limited either by exhaustion of the user's needs or interest, by exhaustion of the database resources, or by an arbitrary limit such as number of steps allowed. Such arbitrary limits prevent abuse of the system while providing most normal users full access. It is also possible that the limits applied are dependent on compensation, for example a subscription level, acceptance of advertising (e.g., banner advertising), filling out a demographic profile, permitting tracking to other sites, etc.

The storage at server level of user patterns of search, both informational and commercial, and particularly the pattern of items purchased or sold, becomes particularly valuable as a database in itself. Because an aspect of the invention creates a process for allowing the user to carefully define a search, the value of the resulting data about the search becomes correspondingly greater. In relation to particular advertisers and merchants, the data can become a goldmine of insight into the "segmentation" of their product, that is, what kinds of individuals or groups or geographical areas favor this product. The value also runs in the opposite direction: that is, as the search engine is familiar with the habits of particular users as individuals or as members of groups, it can direct context sensitive advertising to such group with greater efficiency than a less accurate search engine.

A context-sensitive facility is provided for relating advertising content (and possibly compensation scheme) to the query, nodal position within a hierarchal tree, search results, past searches, past activities, or individual or group characteristics of the user. Thus, the advertising may be optimized in some manner to best appeal to the user, while producing the maximum perceived benefit to the advertiser.

In another embodiment of the invention, a user has a choice of a series of general or categorically organized web databases of increasing size in terms of web documents encompassed. Each increasingly large set will have greater size but lower overall measured "quality," where quality is defined as predicted relevance for queries propounded by most uses. The user could make the tradeoff himself or herself. Alternatively, a query may be processed first through a small, high "quality" database, and if the resulting set of found documents is too small, measured either subjectively or objectively, then user would be bootstrapped up to a higher level of size and lower level of average quality. This method differs from techniques that perform a search on a complete database and then return a limited number of records ranked in order of "relevance", in that the distinct databases provided are preselected for "quality" level. Both techniques may therefore be separately applied, i.e., selection of database and ranking with truncation of displayed records.

Another aspect of the invention provides a system and method wherein a user finds a site or document of interest. A Summary is automatically prepared, which may then be edited or modified by the user. The user may then ask the search engine to search for like documents on the web, based on keyword or phrases from this Summary. Likewise, the summary may define a predetermined or ad hoc taxonomy, which may then be edited or modified by the user, the system then populating the taxonomy with defined or referenced objects.

Figure 7:
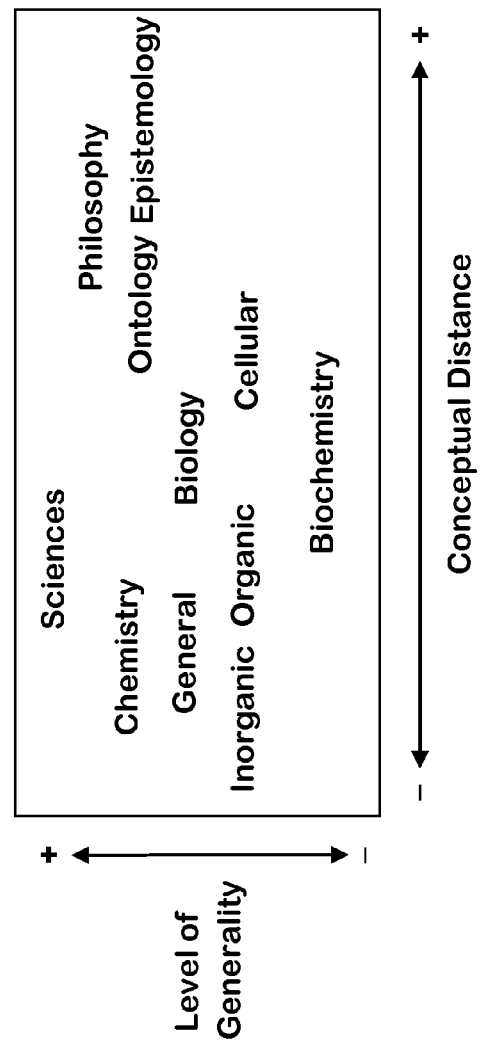
FIG. 7 shows concept cluster mapping.
Figure 8:
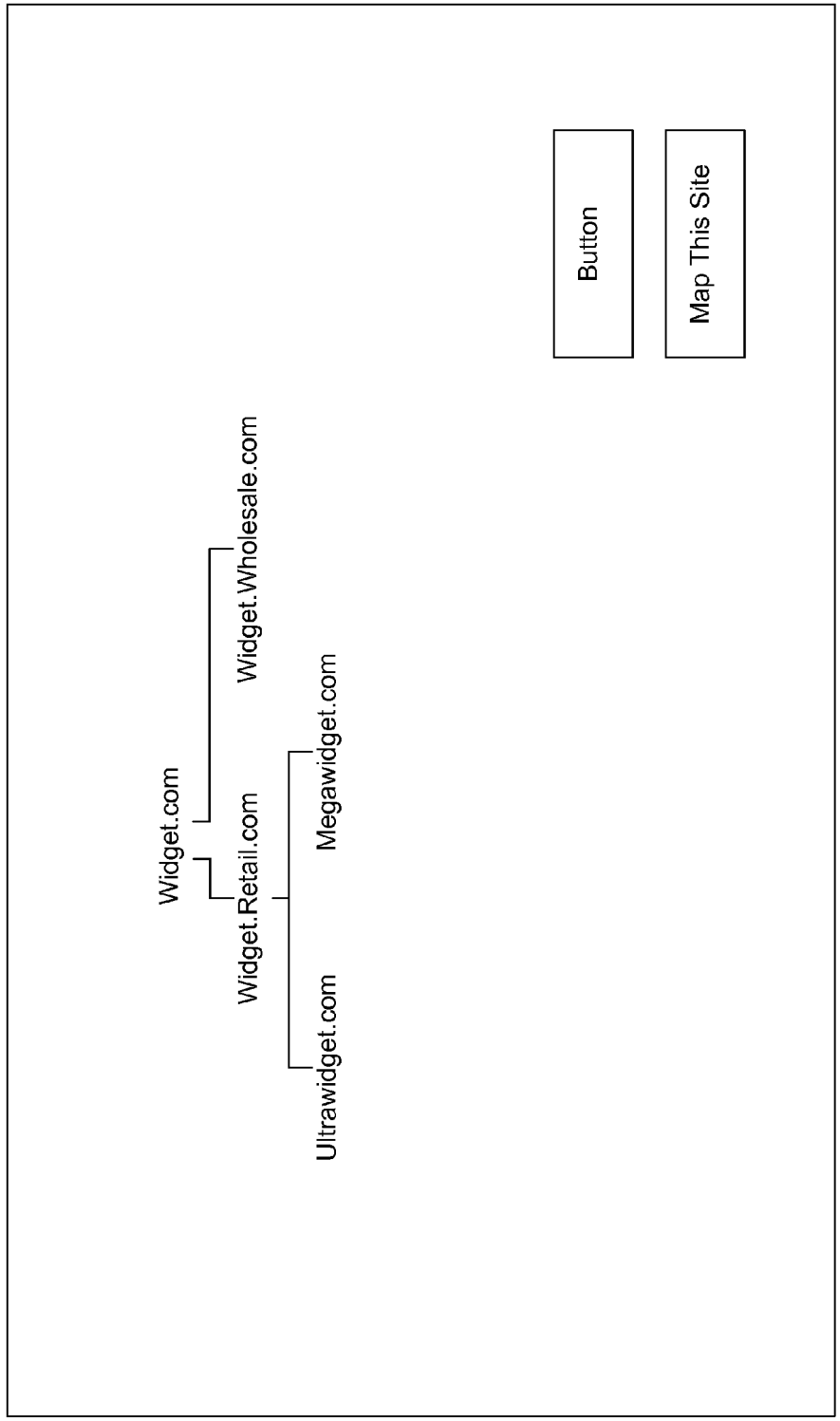
FIG. 8 shows site mapping.

Because aspects of the present invention envision displaying useful information in a pictorial format, and because this format may sometimes require the use of small type size, or may be used by the visually-impaired, the invention preferably provides that as one passes a cursor over an area of interest, that area may be enlarged, as if passing a magnifying glass over that area. This technology is known and at the present time can most readily be applied via the browser. In an extreme case, even an entire taxonomic tree could be presented at once, and one could zoom in on certain highlighted areas of potential interest, as an alternative to the model of separate zoomed-in areas representing portions of the taxonomy. See FIG. 7. This scheme effectively allows multiple scale representations of the taxonomy without further reference by the client to the server.

A user may also wish to adjust certain settings for relevancy, as provided in U.S. Pat. No. 5,966,126 (the sliding controls or mixing-preamp visual representation). As explained therein, such factors as conceptual relevancy, proximity, linkages, blockmodeling, presence in title, popularity of site, duration an average users stays on the site or others, may be weighted by a user as to their proper importance in the relevancy model for this inquiry or group of inquiries. If the user, for example, strongly favors the popularity model, user might set this control to the maximum, and others at zero or lesser levels, in order to see the most popular sites first. In the case of a search for commercial content, other factors, such as price, quality, availability, guarantee, consumer or expert ratings, could be the critical relevance variables.

Also, in the course of a metasearch, a user may wish to determine the weighting of individual search engines or search approaches, in which the user may be given the option to do based on 1) an explicit weighting of individual search engines, 2) through a weight of search approaches associated with individual search engines, 3) through a ranking of certain desired qualities, such as speed of search, comprehensiveness of database, or richness in certain content such as video. For example, the Google™ Internet search engine is associated with linkage analysis, Alta Vista™ with keyword analysis, and Direct Hit™ with popularity analysis. A user may thus rank as follows, Google 10, Alta Vista 7, and Direct Hit 6. Alternately, a user might select, Popularity Analysis 10, Linkage Analysis 9, and Keyword Analysis 6. The numbers cited could correspond to explicit input or, for example, positions of sliding controls or other analog like devices, as illustrated in U.S. Pat. No. 5,966,126 and U.S. patent application Ser. No. 09/353,305, expressly incorporated herein by reference. Similarly, the user may have in mind other variables that may be controlled by sliding controls, normally expressing continuous or analog variation, or stepped variation, but in some cases also bipartite choice. For example, a search for a certain manuscript could be by length, rated originality, and keyword proximity; a commercial search might be by price, quality, reliability; a chemical search might be by core chemical structure, substitutions from a generic structure, atomic weight, hardness, or valence.

Yet another improvement provided by the present invention involves the separation of web documents with adult content, particularly erotic content. The nature of this problem is binary: in most cases—a user either is or is not searching for erotic content, generally not both simultaneously—is not well dealt with today by conventional search engines. A search of the phrase "dog AND pony" on many sites brings forth significant bestiality content, but also information on pets and animal husbandry. The present invention may provide, as is known in the art, a technique for filtering out most erotic sites. Such techniques typically involve searching for sexually oriented key words. However, the present invention might also provide for the filtering out of violent content through a search for repeated violent key words. By analyzing not only the words on (or embedded in) the web page, but also the surrounding context, including other pages within the site, cross references from or to the subject page, and possibly non-semantic content attributes of the page, filtering decisions may be made. Thus, the hierarchies may serve the purpose of both pass and reject filtering of information.

The user then proceeds to submit the search request. This will be in the form of a natural language inquiry, or for advanced users, preferably through the Boolean graphical interface described in U.S. Pat. No. 5,966,126. During the latency period while user waits for results, which typically would be about ten to twenty seconds, the user will be prompted as to whether there is a category under which any useful results should be saved, either as pages or as hyperlinks. In order to provide compatibility with normal web browsers, this intermediate function may be implemented by an applet or helper application, so that the HTTP communication session is not interrupted, nor the available bandwidth hogged by ancillary activities. Alternatively, the user may choose from categories suggested by the server, those categories being driven by the portion of the taxonomy from which user selected a sub-domain for the search. As the user progresses with this and other searches, he or she will be encouraged to develop one or more personal zoomable nested nodal networks, around which the user may organize useful web or other resources, including files from the user's own computer. It may be suggested to the user that a useful model for such organization may be different vocational, avocational, and familial interests of the user; alternatively, the organization might be by subject matter fields, by chronology, by alphabet, or some combination thereof. A taxonomic hierarchy based on a known classification of knowledge may also be provided, which optionally may be modified by the user. The user would be free to draw links among segments of the tree both horizontally and vertically, and the lines could have various meanings and graphic characteristics, e.g., solid and dotted, depending on a characteristic of a connection, and indeed the nodes and lines may have multiple graphic characteristics which are either continuously or selectively viewable, representing more complex organizational principles. This organizing device will henceforth be called the "Little Tree"™.

However, as the latency period between the submission of the refined search request and the receiving of information from the server may be quite short, owing either to the advantages of the present invention in refining the query, or owing to the availability of massive processing power [as for example now experienced at the site of Fast Search, whose URL is www.alltheweb.com], then the activity of saving web favorites and other files can be usefully postponed until the Postsearch™ process. In this case, the user could be apprised of a very short waiting period through the use of a clock, in which the estimated brief waiting time could be given. The invention also envisions that Little Tree™ can be a freestanding web-appliance, or licensable module, to save one's favorites.

Thus, the functionality of Little Tree™ may be provided as a separate application that is usable in conjunction with the web browser and operating system, and indeed which treats both local files and URIs as objects to be organized and represented.

Further, although preferably a user is presented with hits after completing the definition process, the invention also provides means in which hits can be provided at each stage of definition, based on a best guess of user's intent up to that point. Thus, very common queries or tasks may be accomplished through a single search interface. Thus, for example, maps, telephone and address directories, personal information, e-mail, and the like, may all be integrated into a single interface or portal.

Figure 5:
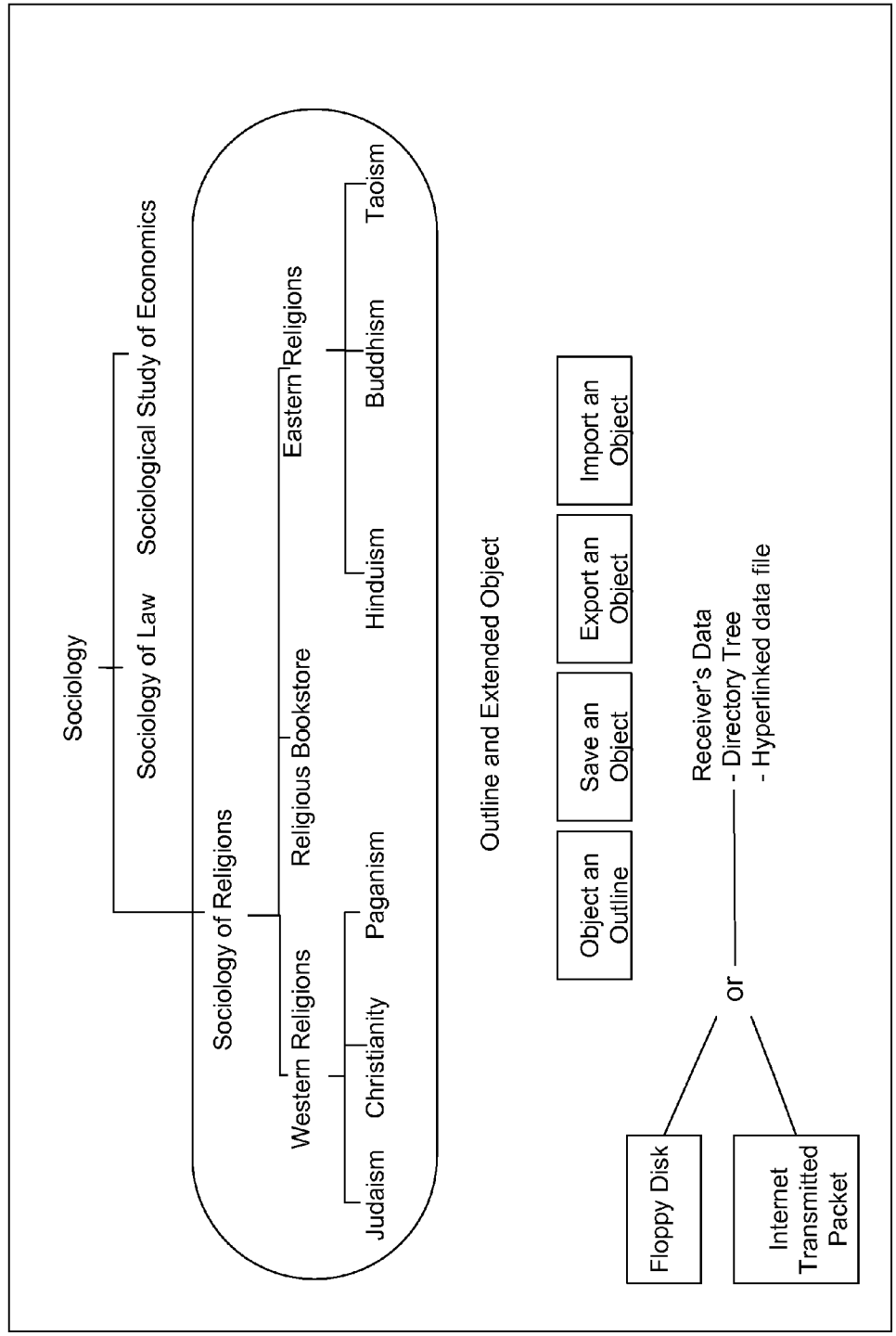
FIG. 5 shows a representation of a nodal network as an object.

Concerning the process of saving favorites and other files and materials in the user's personal tree format, the invention also preferably involves—in its so-called "Big Tree"™ format—giving the user the ability to translate the user's computer directories, such as may be stored for example on a hard disk or elsewhere, into a zoomable nested nodal network format. This application could be run at any time, online or offline, and would provide an improvement over functionality of such tools as the Microsoft Windows Explorer or NT Explorer, or equivalent services of other operating systems such as Macintosh, Linux and Unix, by allowing user to add, move, delete, review, and revise contents using a tree format rather than such other formats as file folders and sub-folders. Once again, the entire tree could be navigated on, as if a big map, as user moves a pointing device to "explore," or certain zoomed-in areas could be identified for exploration by a user command or gesture, or by response to a user query. Preferably, the user could set the pointing device in a move mode when user wished, to facilitate moving items without keeping a mouse button or analogous device depressed, so that items could be picked up and a dropped off with single clicks, to facilitate ease of use and accuracy. See FIG. 4. The user could therefore take web favorites from a search result and embed them in user's Big Tree™. Thus, a seamless integration of the personal computer and Web resources can be achieved visually. It is noted that the Big Tree™ may be persistent or transient; for example, a Big Tree™ may be constructed for a project, and eliminated from the user's current sphere when the project is completed. The Big Tree™ may be formulated as an object which may be transmitted, and thereby permit exploration and/or modification by various users. See FIG. 5. In addition, for topics of common interest, the server may store preformulated zoomable nested nodal networks, which are transmitted to the user. Thus, in contrast to present systems for conveying information, such as Lotus Notes, a zoomable nested nodal network organization can be transmitted with data files, such that the receiver of information has an experience analogous to opening up a private web site custom tailored for a particular purpose; indeed, the present invention also provides that such zoomable nested nodal networks could then be saved in a form from which they can be publicly or privately retrieved from a specific URI, i.e. a "web site." The invention also envisions that the Big Tree™ application, or a Little Tree™/Big Tree™ combination, could be a freestanding or licensable web appliance or application that would offer an alternative to services provided by such appliances as Internet Explorer and NT Explorer, with the enhanced functionality offering an improvement over those alternative appliances.

Advantageously, a user may be given the option to have a Summary prepared of the user's own files, for example, as residing on the hard disk of a computer or on peripheral device, or stored remotely through the Intranet or an extranet, either as a useful precis in itself, to be saved or disposed of as needed, or also as a way to generate keywords and keyphrases that can facilitate automatic organization and placement of objects in a taxonomic scheme or tree or other conceptual map.

One advantage of the present invention is that, in contrast to the file folder metaphor provided by known graphic user interface operating systems, the present tree-based metaphors permit an n-root visualization, and therefore overcomes many of the inherent limitations of the prior systems. File folders encompass only a single root, and if viewed from a different root, the entire view changes. An n-root visualization of a tree metaphor provides the ability to visualize multiple parents and children simultaneously. In the case of a radial organization, multiple centers may be visualized. Further, the tree metaphor is consistent between the file operating system and the Internet, with URIs and local files being treated potentially equivalently. File folders also are limited to a single, hierarchy, with the possibility of cumbersome aliasing. In contrast, the tree metaphor according to an aspect of the present invention permits multiple distinct hierarchies to be represented.

The present invention also permits replacement of a user's virtual desktop in a graphic user interface operating system with a different paradigm for accessing objects. This paradigm is represented by a hierarchal tree in which references to objects of various types, as well as navigational linkages between objects, are defined. The structures represented in this paradigm may themselves be transmitted as objects. In this system, the hierarchal linkages between various objects can all be represented on a single plane or level, facilitating visualization of the interrelations. Further, each object of the hierarchy may be an iconic hyperlink, allowing direct relation between the visualization and implementation. This is similar in some senses with the nested menus as implemented by Microsoft in Windows 95/98 systems; however, according to the present invention, rather than being a part of a program or operating system, these are used dynamically by applications and employ data files that are transmitted.

Another aspect of the present invention is that the taxonomic structures represented need not be limited or controlled by an operating system file organization. Therefore, elements in different locations may be viewed together or vice versa. In addition, singular files, treated as a single object under an operating system, may be analyzed and segmented, and represented as a flexible aggregation of objects within the zoomable nested nodal network. Thus, the taxonomy may be applied to subset portions of files or pages, in the manner of a cross-file table of contents. In turn, this allows a taxonomic analysis on a fine-grained level, facilitating classification of the subset portions. The tree organization may therefore be an adjunct or partial replacement for portions of traditional computer operating systems. Alternatively, the invention may be embedded in an operating system such as Windows 2000, Macintosh 8.0, or the like, thereby enhancing such systems. Such embedding may be in the manner of OCX, DLL, or other known operating system extension formats.

Figure 6:
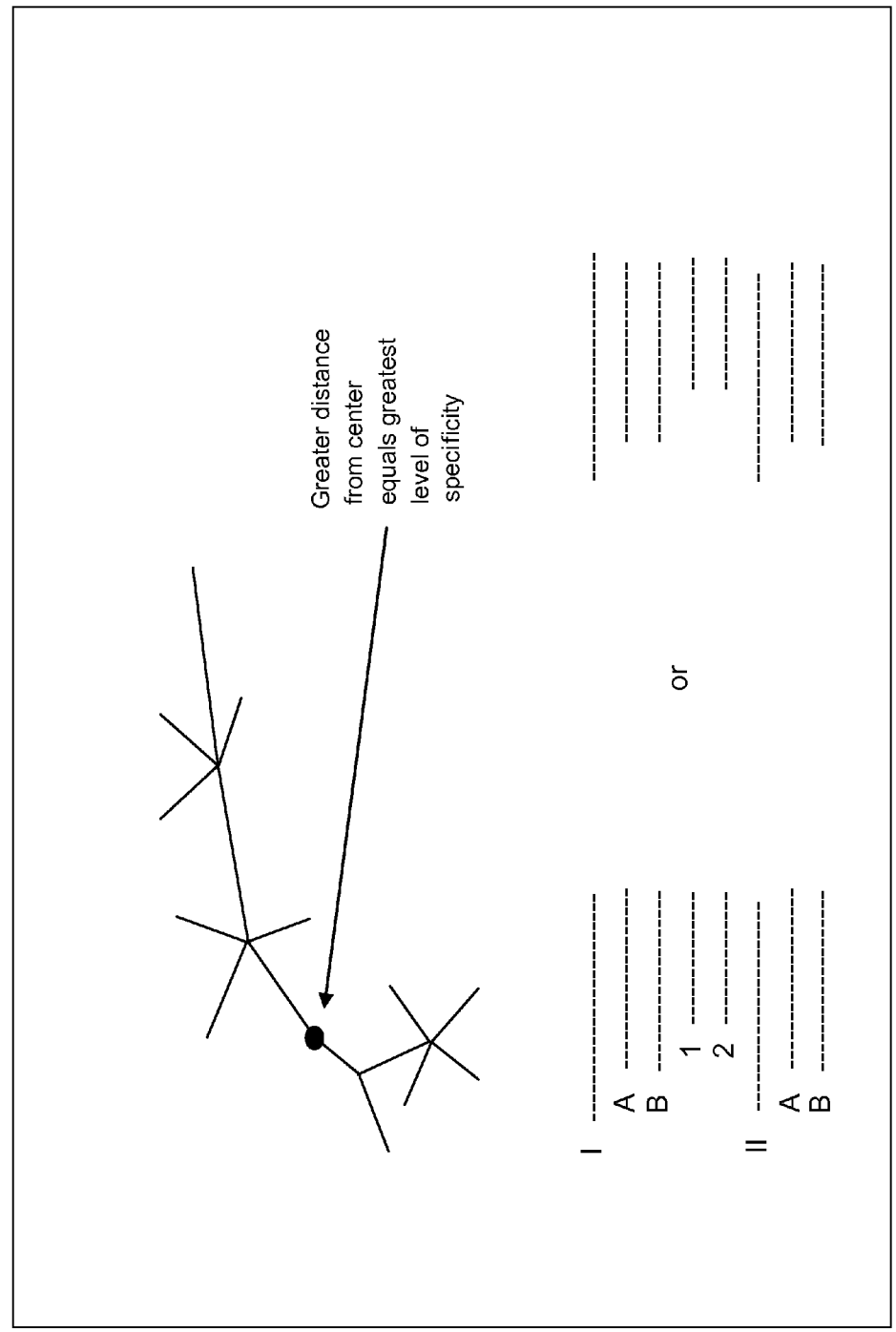
FIG. 6 shows star and outline visual representations of a nodal network.

Although the taxonomic tree format is a preferred visual embodiment of the invention, it can be seen to those skilled in the area that other visual representations can accomplish all or various of the schemes of the present invention, as illustrated in FIG. 6. Possible visual representations include a traditional outline (lower portion of FIG. 6) and a hub and spokes (or star) (upper portion of FIG. 6). References herein to taxonomic representations encompass these alternative formats.

Figure 3:
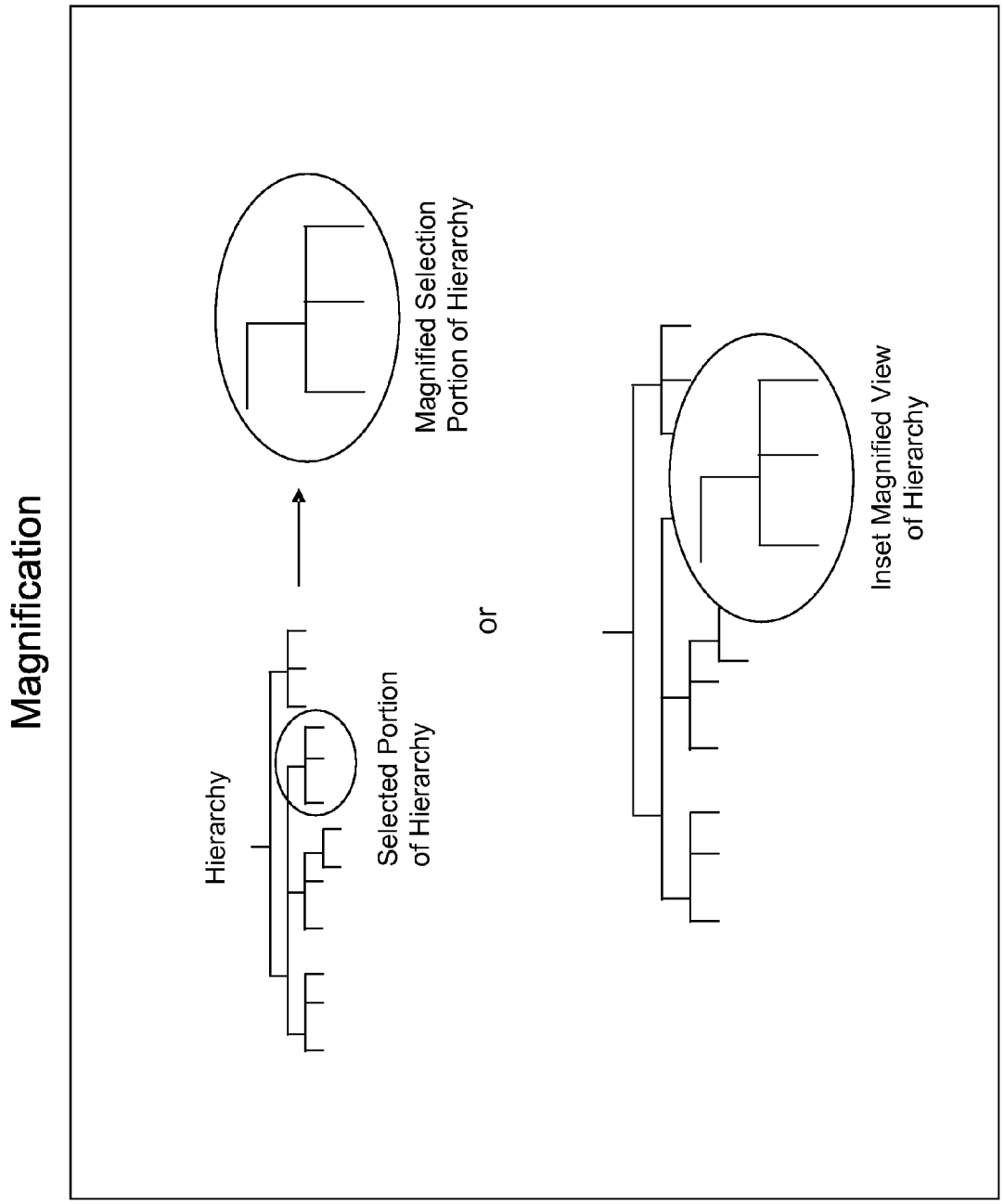
FIG. 3 shows magnification of a nodal network.

Another possible visual representation is the idea of conceptual clusters. Certain nodes can be represented as close to one another without the formalism of logical branching. For example, these clusters can be mapped into groups based on linguistic, visual, auditory, or tactile associations, in the manner of a scatter plot, or of regular or irregular geometric figures representing constellations of such nodes. Further, just as one can move from a taxonomic view to a more refined or detailed taxonomic view, one could touch on a cluster to get a similar effect, either more or less general, or make a lateral gesture to sweep laterally. See FIG. 3. In a preferred embodiment, horizontal placement would indicate conceptual distance across a similar level of generality, with upper portions representing high generality, and lower portions representing low generality. Obviously, many other principles of organization can be employed. Further, in such a map, a height dimension could be used to represent frequency or relevancy, although one would then have to be able to see through or around raised objects, for example by means of translucency or cutaways or by visually or virtually "walking" around the blocking objects.

Responding directly to this need, the present invention a field of improvements for a user's experience through so-called Site Mapping™. See FIG. 4. In this process, large groups of web sites can be organized, through either a human librarian or an automated process, into entities having common mapping and navigation characteristics; these pre-mapped sites would be updated frequently to take into account any changes. Alternatively, individual sites can be so organized in real time, "on the fly," prior to navigation of such sites, or in close to real time, with the result returned as a batch file via e-mail, instant messaging, or via a web site retrieval process. Site Mapping™, in effect, provides a familiar, organized overlay to the user as he or she visits different sites with their various contents, organizations, and means of navigation. Features of Site Mapping™ might include availability of a desired visual organization of the contents, such as Table of Contents, Index, or a hierarchical structure, such as a tree, hub and spokes, nested groups arranged as files, or might preferably be arranged as conceptual clusters. In most cases, a branched network, similar to conventional site maps now present on web sites, would be preferable. Preferably, the nodes on the map would be hyper-links leading directly to the relevant page of a site's content, rather than necessarily to the home page. The status of the system, e.g., the page presently being visited by the user, may be indicated within the site map, for example by a change in typestyle, color, size or attribute of the associated text for the distinguished URI.

Site Mapping™ differs from the site maps found at some web sites today, however. First, the site map would be intended to provide a unifying model by which the user can view countless different web sites. In generating such site maps, a so-called web "spider" may crawl all or select portions of the web and create a ready-made set of such site map overlays, for convenient or rapid use. Such maps could be built by human librarians or automated by special site mapping software. As a business model, these maps could be subsidized by advertising, by usage charges to consumers or businesses, by usage charges to the sites indexed, or by e-commerce or commission splitting generated or facilitated through the convenience and appeal of the site map. The Site Mapping™ scheme dovetails with the concept of receiving revenues from advertisers seeking to offer elaborated commercial content in a hierarchical form, such as in clustered nests or as part of a taxonomic tree, by providing a suggested preliminary or final model for such content. The Site Mapping™ facility could in itself be sold or licensed as software that operates independently of the other features of this invention, and which might be used by users of the web or by other search engines, browsers, and/or portals. Site Mapping™ may also be a valuable service meriting the payment of licensing or use fees for the following groups of users: librarians of data collections, whether human or electronic; censorial groups that exist in organization that monitor improper use of proprietary electronic resources; and/or commercial intelligence.

Site Mapping™ on an automated basis requires overcoming certain technical obstacles. First, although some web sites have built-in site maps, not all do, and those that do may not have them up to date or they may be difficult to use or interpret. Second, many sites do not offer a search engine or index, and those that do may be unfamiliar, ineffective, inefficient, or difficult to use. Third, many sites have subdomains related to them that are difficult to identify. For example, Widgets/Warranty/Terms may be easy to identify, but domain Service.Widgets/Warranty/Terms, would probably be difficult to locate. Fourth, may sites have anti-robot technology that may bar queries from an Internet address that appears to be scanning the site automatically and rapidly.

The Site Mapper™ could also include a facility for input or feedback from the underlying web site proprietors or users. This feedback could be in the form of corrections to the Site Mapper™'s previous work. Web proprietors could also be encouraged to submit a proper site map of their site, with correct linkage and hierarchy, according to a consistent format accepted by the Site Mapper™. A site map developed on a fly could also be the basis for the proprietor of a web site to post a map of its own site, including after refinements and edits. Conceivably, such a format could tend to influence the development of a web standard for site mapping and related software that could be sold commercially or offered as freeware The algorithms driving the Site Mapper™ engine that can produce a site map of web sites, that are otherwise incompatible, would exploit certain key clues in inferring a site structure. First, it could open a site and explore all hyper-links found from the site page forward, and seek to connect those links, links to links, and so on, so as create a drawing of the links. Second, it could distinguish between links to outside sites from links within the site. Third, it could seek clues to hierarchy in the use of the slash (/) and dot (.) symbolism of unique URI's to infer apparent seniority. For example, IBM/Patent/Recent and IBM/Patent/pre-1963 show an apparent structure based on two "children" of IBM/Patent and "grandchildren" of "IBM." Dot symbolism also creates seniority to the left in many instances. Fourth, the Site Mapper™ could treat the matter within the site as a domain to be organized, and it could use the technology of automated indexing to create an Index, including an alphabetized and searchable index.

In another implementation of Site Mapper™, the search engine, being asked to map a certain site, has recourse to a set of indexed documents and generates the site map based on the indexed links. The Site Mapper™ engine may also map individual web sites on the fly, to determine their internal structure. In this case, dead or empty links may be discovered and indicated to the user, for example with an indication of the amount of data at any web page.

Preferably, Site Mapping also provides, either as a feature to be saved and associated with particular nodes of the Site Map, or in real-time, or both, a Summary of the contents of materials referenced by the Site Map. The invention also contemplates that the Site Mapper™ could be a freestanding or licensable web appliance.

It is also possible for the search engine to return search results from a query to the user in the form of a tree object, e.g., a zoomable nested nodal network. The user may then probe or investigate the object, without referencing the specific contents thereof, to determine the relevant portions thereof. Therefore, as is known, a search engine retrieves an over-inclusive result; it is often considered inefficient to attempt to provide a narrow yet complete search result due to the extensive processing time required. Thus, by returning both the search hits and data defining various relevance criteria in a single data object, the user is permitted to investigate the result as a whole.

The tree object also provides a substantial opportunity for the integration of advertising content. The user, in identifying the restrictive search criteria, necessarily reveals an area of interest. To the extent that commercial interests overlap with the expressed area of interest, which are defined by the taxonomic representation, advertisements may be represented as nodes or groups of nodes in the tree. See FIG. 9. In some cases, commercial intrusion is unwanted or unwarranted, and might be effectively ignored, but should at least handled consistently, i.e., the user must view banner advertisements during use of the tree object viewer. On the other hand, in many instances, the user is commercially motivated, and seeks useful information from product or service providers. In this case, substantially deeper content may be made available within the context of the tree. To obtain a separation of commercial and non-commercial content, the commercial portion of a taxonomy could be identified by an outline, a special color, or other demarcation. Thus, for example, the user may write the sentence in a clue box, "I want to buy a Durango." Using a method presented by this invention, the user may then be presented with a series of zoomed in views of a taxonomic tree, one of which might show, in decreasing levels of generality, 1. autos, 2. US, 3. Chrysler, 4. sports utility vehicles, 5. Durango; in this case, everything below Chrysler may be elaborated commercial content of the taxonomy in the sense just described. The user could go directly then to a desired part of Chrysler's web site, for example, without the discouraging factor of needing to navigate that site.

In fact, each result may also be organized as a presentation, or group of presentations. Such an object is relatively easy to use, as the user may be a passive observer during a presentation. The cost of preparing high quality presentations may be offset by commercial providers, in the form of commissions on sales, advertising or sponsorship fees, or the like. By preparing these objects using multivendor information, a service is provided which no single vendor could (or would) supply, in the manner of a trade publication. By linking the final preparation of an object with the search query and search engine results, a customized object is available. The object, it is noted, need not contain the entire presentation or full content, merely the required hyperlinks to access the content, and preferably information relating to a taxonomic linkage of the hyperlinks and also preferably information defining relationships between the search query and/or content referenced by the hyperlinks. In this sense, the tree object may provide sequence and timing information for the presentation, in the manner of Synchronized Multimedia Interface Language (SMIL) or HYTIME.

According to another aspect of the invention, a revenue model is provided whereby advertisers may bid for placement in a list of relevant results, in the manner of the bidding process used for relevance ranking used as www.goto.com. However, in distinction to the model employed by www.goto.com, this model may provide for the isolation of the paid relevant rankings from the "objectively" relevance rankings. Such an area of "associated commercial content" could be represented by a parallel taxonomic tree or a list. Such associated commercial content is distinguished from banner ads, and like promotions, in that the content would consists of hyperlinks rank ordered by an economic criterion, that is, highest utility, however measured, e.g., price paid by the advertiser. Thus, the present invention provides a useful revenue model for the subsidy of its many useful features thereof while avoiding the problem of "contamination" of the objectively ranked or ordered results, which has been a frequent criticism of the practice followed, most prominently, by the business associated with the web site www.goto.com.

The term "agent" refers to a "smart" software construct that can act intelligent on behalf of the user to accomplish tasks. The term is sometimes used in a strong sense to refer to a process where user gives power of attorney to a computer agent to buy or sell goods or carry out other tasks. Such agency services could include finding the best price for a good or service, placing (or buying) a good or service in auction, checking on availability, providing product updates, providing news updates, and other services. These agency services in many cases may reinforce or facilitate business models of the search engine, i.e., the user's economic goals are generally allied with the business interests of the search engine or portal provider. In many cases, the user may provide a personalized profile, to be located at the client level as a "cookie" or at the server level in a mass storage device, in order to better carry out the agency role. The user may also be identified through a username/password scheme, allowing a single user to employ multiple computers or guest computers. The server may also provide a personal and/or personalized home page function.

The present invention serves not only consumers looking for products but also products (and services; that is manufacturers, service providers and distributors) looking for consumers. The product providers may further subscribe to a service that customizes their portion of the taxonomy in relation to known characteristics of the user. For example, if the advertiser sells luxury sedans, it might situate its commercial messages (ads) within a portion of the taxonomy having a high probability of being presented to mothers, by emphasizing safety features. It might also situate its commercial messages (ads) within a portion of the taxonomy having a high probability of being presented to a young man, by emphasizing special branches relating to power and performance. Pages from the same or a different linked commercial web site could be opened directly as hyperlinks. In this way, just as one speaks of interactive advertising, there could be an interactive taxonomy.

Another potentially valuable service of the search engine is an aggregation of many discrete charges for e-commerce, including purchase or leasing of premium information content as well as goods and services. Since these payments for premium content tend to be small, this aggregation service would be convenient for many users. These charges could be repaid through many means, including direct billing, credit card, or via the local telephone company or ISP provider bills. The advertiser subsidies may be used to offset charges, which are typically accounted for in a micropayment scheme such as MPTP, Millicent, etc.

After identifying a role in society or profession of an individual, a template may be retrieved, defined or created for that individual. The template may be customizable, and indeed the customization by the user may be a valuable source of information for the database to improve the performance of the system with respect to the queries propounded by all users having the common role or profession. Ideally, a user registers with the system once, and is subsequently identified with a cookie from the Internet browser (or username/password) that calls up a user-specific file, which controls user-specific performance of the system.

Many aspects of the present invention employ known techniques, although employed in different contexts herein. Therefore, it is understood that these known techniques and those associated with them may be employed in conjunction with the present invention, to the extent consistent therewith.

It is also understood that the various aspects of the invention may be employed together, individually or in subcombination. Further, it is understood that the present techniques are not limited to use on the Internet, as presently known, and may be applied to a large number of human computer interface systems.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What I claim is:

1. A method of visualization of a set of objects in a computer graphic interface, comprising:

defining a hierarchy of objects, the hierarchy of objects having hierarchal relationships between a plurality of objects each having associated content, a hierarchal organization of the hierarchy of objects being related to a respective content of an object and being included within the hierarchy based on satisfaction of a set of inclusion criteria; and supplementing the hierarchy with at least one additional object which does not satisfy the set of inclusion criteria, the at least one additional object being selectively placed within the hierarchy of objects based on an associated content of objects within the hierarchy of objects near the placement position of the at least the additional object and an associated content of the respective additional object.

2. The method according to claim 1, wherein the at least one additional object is associated with an object based on a collaborative filter.

3. The method according to claim 1, wherein the at least one additional object comprises an advertisement.

4. The method according to claim 1, wherein the set of objects is defined based on a search query.

5. The method according to claim 1, wherein the set of objects is produced by an Internet search engine.

6. The method according to claim 1, wherein the set of objects is produced dependent on a user profile.

7. The method according to claim 1, wherein the at least one additional object is placed in the hierarchy in a contextually appropriate position.

8. The method according to claim 1, wherein an object or additional object is selected, and subsequently a set of objects similar thereto is identified.

9. The method according to claim 1, wherein an object or additional object is selected, and the hierarchy is then transformed to place the selected object or additional object at a root node of the hierarchy.

10. The method according to claim 9, wherein the hierarchy is represented as a set of hierarchal nodes and selective interconnections therebetween, wherein hierarchal nodes above a node containing the selected object are hidden.

11. The method according to claim 1, wherein an object or additional object is selected, and a set of objects similar to the selected object or additional object is returned based on a similarity of one or more of a nature of a product, price, quality, warranty features, and service.

12. The method according to claim 1, wherein the set of objects is defined based on a Boolean search.

13. The method according to claim 1, wherein at least one object within the hierarchy is selected based on a Boolean criteria.

14. The method according to claim 1, wherein the hierarchy comprises a zoomable nested nodal hierarchy.

15. The method according to claim 1, wherein the hierarchy comprises a predetermined taxonomy.

16. The method according to claim 1, wherein the hierarchy comprises an ad hoc taxonomy.

17. The method according to claim 1, wherein the hierarchy comprises a semantic taxonomy.

18. The method according to claim 1, wherein a subset of the set of objects of the hierarchy are presented to a user.

19. The method according to claim 1, wherein a first portion of the set of objects is populated into the hierarchy for presentation to a user, and a second portion is hidden from the user.

20. The method according to claim 1, further comprising the step of defining a user context and selecting a hierarchy for organization of the objects in dependence on the context.

21. The method according to claim 1, wherein the at least one additional object is a commercial promotion object, subject to pay per click compensation.

22. A computer readable medium accessible by a programmable processor adapted to perform the method according to claim 1, storing at least the defined hierarchy of objects and the at least one additional object.

23. A system for visualization of a set of objects in a computer graphic interface, comprising:
 a hierarchy comprising a plurality of objects which satisfy a set of inclusion criteria and a respective hierarchal organization of the plurality of objects, the plurality of objects each having associated content, a placement position of an object within the hierarchal organization being related to a content of the respective object;
 at least one additional object, supplemental to the hierarchy, a placement position of the additional object within the hierarchal organization being selectively based on a relationship of content associated with respective nearby objects and a content associated with the additional object; and
 an output, adapted to present the hierarchy and the at least one additional object to the user.

24. The system according to claim 23, wherein the at least one additional object is associated with an object based on a collaborative filter.

25. The system according to claim 23, wherein the at least one additional object comprises an advertisement.

26. The system according to claim 23, wherein the set of objects is defined based on a search query.

27. The system according to claim 23, wherein the set of objects is produced by an Internet search engine.

28. The system according to claim 23, wherein the set of objects is produced dependent on a user profile.

29. The system according to claim 23, wherein the additional object is associated with a contextually appropriate object within the hierarchal organization.

30. The system according to claim 23, wherein an object or additional object is selected, and subsequently a set of objects similar thereto is identified.

31. The system according to claim 23, wherein an object or additional object is selected, and the hierarchy is then transformed to place the selected object or additional object at a root node of the hierarchy.

32. The system according to claim 31, the hierarchy is represented as a set of hierarchal nodes and selective interconnections therebetween, wherein hierarchal nodes above a node containing the selected object are hidden.

33. The system according to claim 23, wherein an object or additional object is selected, and a set of objects similar to the selected object or additional object is returned based on a similarity of one or more of a nature of a product, price, quality, warranty features, and service.

34. The system according to claim 23, wherein the set of objects is defined based on a Boolean search.

35. The system according to claim 23, wherein at least one object within the hierarchy is selected based on a Boolean criteria.

36. The system according to claim 23, wherein the hierarchy comprises a zoomable nested nodal hierarchy.

37. The system according to claim 23, wherein the hierarchy comprises a predetermined taxonomy.

38. The system according to claim 23, wherein the hierarchy comprises an ad hoc taxonomy.

39. The system according to claim 23, wherein the hierarchy comprises a semantic taxonomy.

40. The system according to claim 23, wherein a subset of the set of objects of the hierarchy are presented to a user.

41. The system according to claim 23, wherein a first portion of the set of objects is populated into the hierarchy for presentation to a user, and a second portion is hidden from the user.

42. The system according to claim 23, further comprising the step of defining a user context and selecting a hierarchy for organization of the objects in dependence on the context.

43. The system according to claim 23, wherein the at least one additional object is a commercial promotion object, subject to pay per click compensation.

\* \* \* \* \*